United States Patent
Kitaura

(10) Patent No.: US 7,629,959 B2
(45) Date of Patent: Dec. 8, 2009

(54) CONTROLLER FOR ELECTRONIC APPLIANCE

(75) Inventor: Masahiro Kitaura, Yokohama (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 728 days.

(21) Appl. No.: 11/229,506

(22) Filed: Sep. 20, 2005

(65) Prior Publication Data

US 2006/0061548 A1    Mar. 23, 2006

(30) Foreign Application Priority Data

Sep. 21, 2004   (JP)   ............... P2004-272706

(51) Int. Cl.
G09G 5/00   (2006.01)

(52) U.S. Cl. .................. 345/156; 345/629

(58) Field of Classification Search .......... 345/156
See application file for complete search history.

(56) References Cited

U.S. PATENT DOCUMENTS

| | | | | |
|---|---|---|---|---|
| 5,454,943 | A * | 10/1995 | Ashton et al. | 210/222 |
| 5,594,469 | A * | 1/1997 | Freeman et al. | 345/158 |
| 5,818,970 | A * | 10/1998 | Ishikawa et al. | 382/248 |
| 6,072,494 | A * | 6/2000 | Nguyen | 715/863 |
| 6,111,980 | A * | 8/2000 | Sano et al. | 382/167 |
| 6,160,899 | A * | 12/2000 | Lee et al. | 382/103 |
| 6,501,515 | B1 * | 12/2002 | Iwamura | 348/734 |
| 6,771,277 | B2 * | 8/2004 | Ohba | 345/629 |
| 2007/0064140 | A1 * | 3/2007 | Kitaura | 348/333.01 |
| 2008/0062125 | A1 * | 3/2008 | Kitaura | 345/157 |
| 2008/0088588 | A1 * | 4/2008 | Kitaura | 345/158 |

FOREIGN PATENT DOCUMENTS

| | | |
|---|---|---|
| JP | 06-153017 | 5/1994 |
| JP | 08-044490 | 2/1996 |
| JP | 08-212327 | 8/1996 |
| JP | 08-315154 | 11/1996 |
| JP | 09-081307 | 3/1997 |
| JP | 2000-075991 | 3/2000 |
| JP | 2000-196914 | 7/2000 |
| JP | 2001-282456 | 10/2001 |
| JP | 2001-307107 | 11/2001 |
| JP | 2002-149302 | 5/2002 |
| JP | 2002-196855 | 7/2002 |
| JP | 2003-283866 | 10/2003 |
| JP | 2004-246578 | 9/2004 |
| JP | 2004-258766 | 9/2004 |

* cited by examiner

*Primary Examiner*—Bipin Shalwala
*Assistant Examiner*—Afroza Y Chowdhury
(74) *Attorney, Agent, or Firm*—The Nath Law Group; Jerald L. Meyer; Sungyeop Chung

(57) ABSTRACT

A controller controls an electronic appliance. The electronic appliance has a display. The controller employs a video camera to photograph an image of a user and converts the image into a mirror image. The controller generates an operational image including operation buttons, overlays the operational image on the user's image, and displays the images on the display. In the displayed images, the user moves his or her hand onto one of the displayed operation buttons and bends the fingers of the hand to select the operation button. This selecting operation is detected by a detector of the controller, and information about the selected operation button is supplied to a processing unit, which outputs control signals corresponding to the selected operation button.

12 Claims, 27 Drawing Sheets

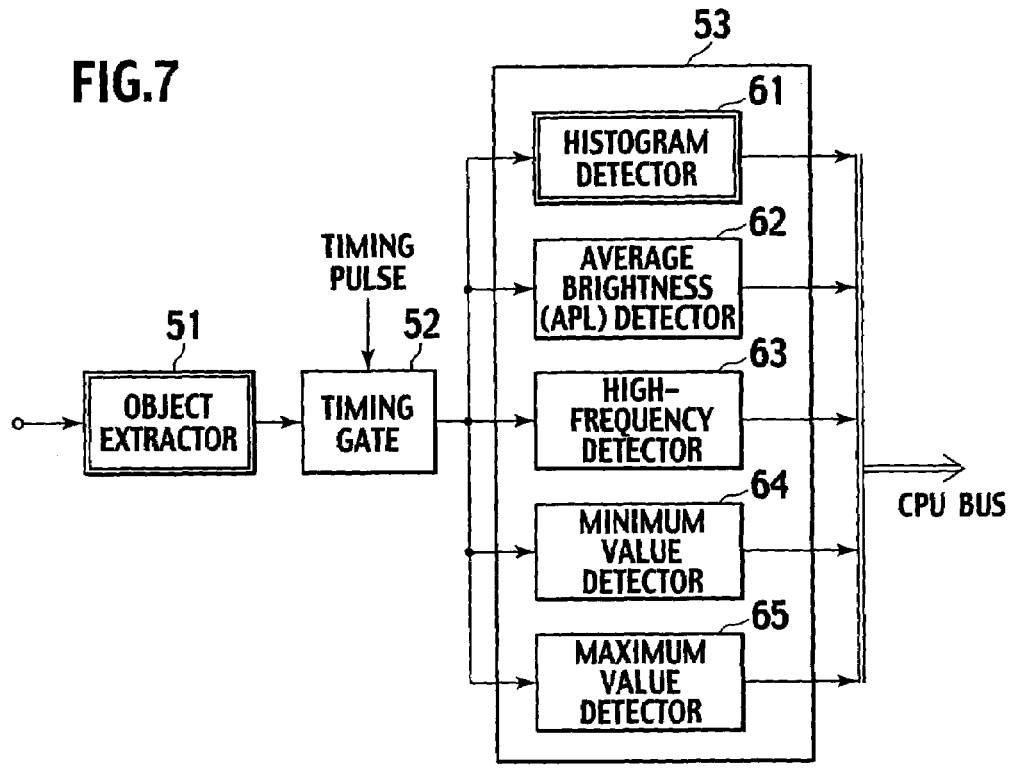
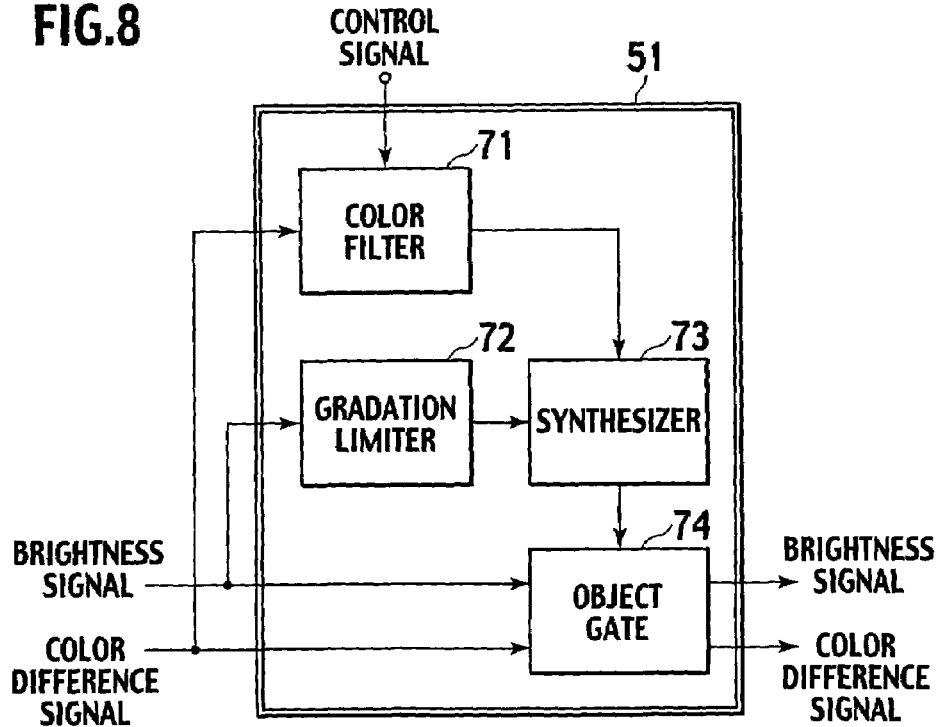

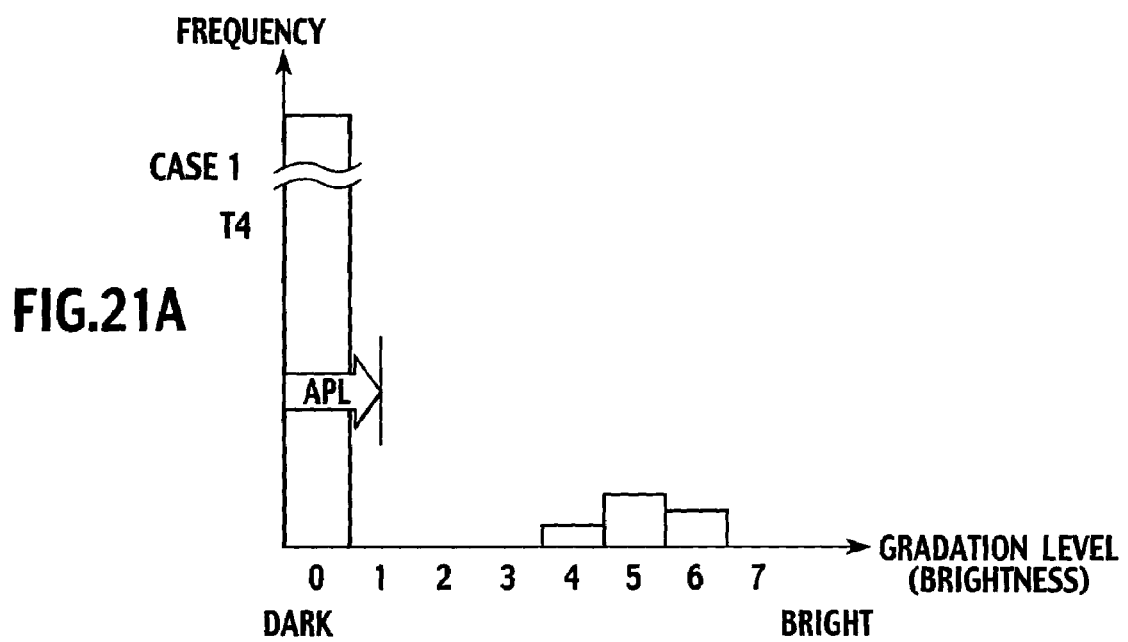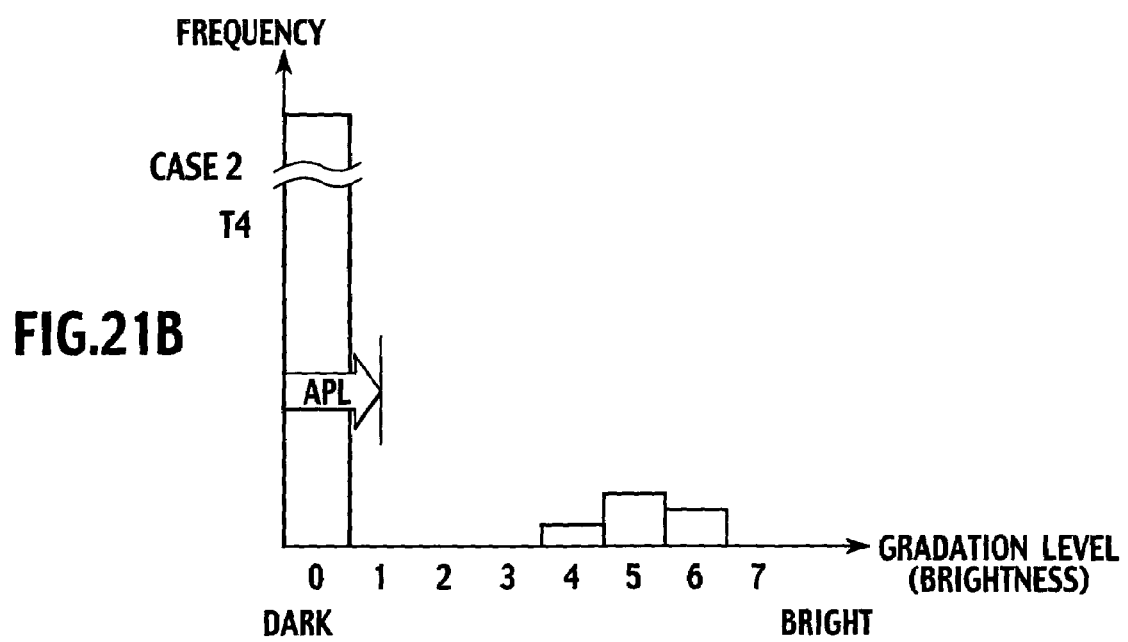

FIG.29
(A)
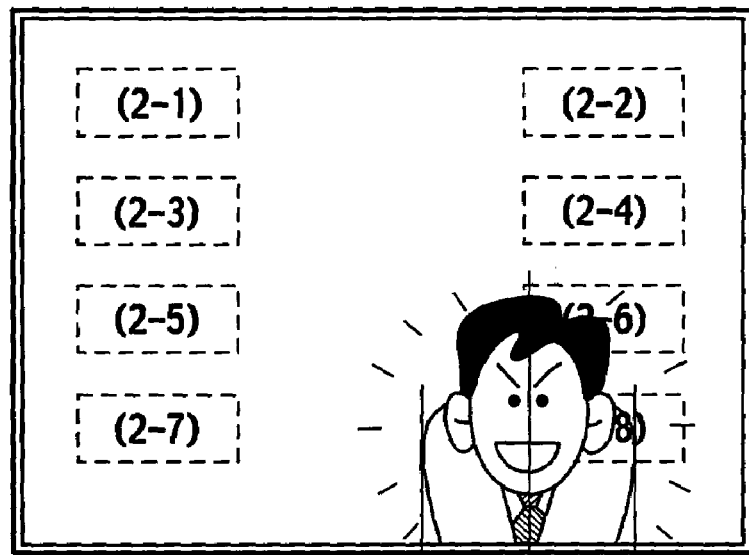
(B)
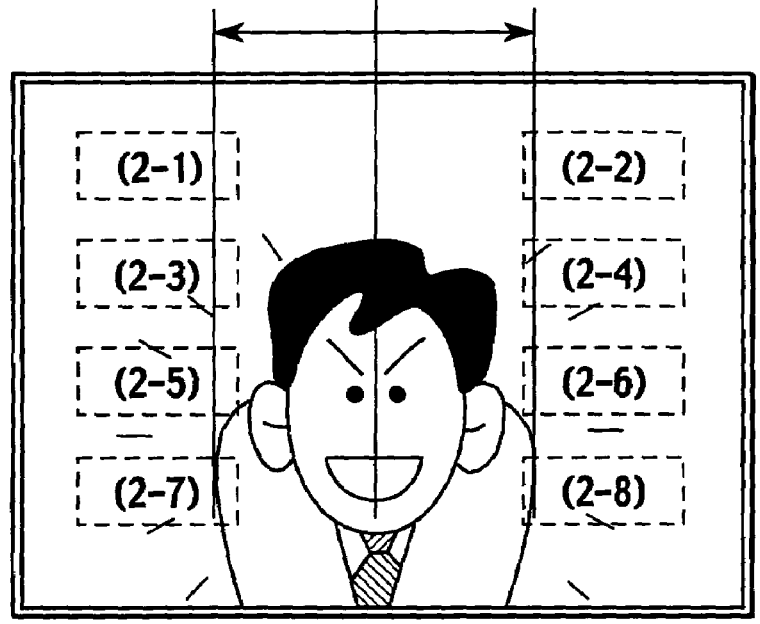

CONTROLLER FOR ELECTRONIC APPLIANCE

BACKGROUND OF THE INVENTION

1. Field of the Invention

The present invention relates to a controller for an electronic appliance, and particularly, to a controller for remotely controlling an electronic appliance having a display, such as a television receiver and a personal computer.

2. Description of Related Art

In the 1980s, home appliances such as television receivers started to have infrared remote controllers. Remote-control user interfaces have widely spread and greatly changed the style of use of home appliances. At present, the remote control is in the main stream. The remote controllers basically employ the same scheme when accomplishing functions. Namely, they require a user to push a key corresponding to a desired function. For example, a remote controller for a television receiver has keys "Power," "Channel," "Volume," "Input switching," and the like to realize convenient remote control of the television receiver.

To control data broadcasting which has started recently, a user must repeatedly manipulate an "Up-down-left-right" key and an "Enter" key on a remote controller until a desired menu is displayed. This is troublesome for the user. An EPG (electronic program guide) displays a matrix of guides and prompts the user to select a desired one of the guides by pushing keys on a remote controller. This is also troublesome for the user.

To cope with the problem, Japanese Unexamined Patent Application Publication No. 2003-283866 has disclosed a controller that employs a position specifying device such as a mouse to provide positional information, encodes the positional information into a time-series of key codes or a time-series pattern of pushed key signals, and transmits the time-series of key codes to a television receiver.

This related art requires a user to conduct a pointing operation, which resembles the pointing operation of a personal computer, when remotely controlling a television receiver. If the user is unfamiliar with a personal computer, such pointing operation is troublesome for the user. Applying the operation techniques of personal computers to home appliances is unreasonable in view of information literacy (ability to use information). There is a need for a new controller suitable for remote-controlling today's television receivers.

Due to advancement in network technology, television receivers and displays for personal computers can display various types of information from storage media or from the Internet. Such a variety of information pieces involve a variety of handling methods, and current remote controllers accompanying home appliances are insufficient to cope with such a variety of handling methods. There is a need for a remote controller capable of coping with many handling methods.

Only by expanding the size and capacity, the conventional remote controller can cover a variety of complicated functions of present home appliances such as television receivers. For example, a menu of data broadcasting requires a user to conduct many steps of pointing operations, and therefore, the user is forced to use the conventional remote controller as a pointing device. The conventional remote controller, however, is problematic to use it as a pointing device. When controlling a plurality of networked devices, the user must manipulate the irrespective remote controllers via a display. The number of remote controllers increases in proportion to the number of networked devices. This problem is frequently experienced in present days when a television receiver, for example, is connected to other devices such as a VTR, a video disk, and an audio unit. It is bothersome for the user to find a correct one among the remote controllers of these interlinked devices. In addition, the conventional remote controller is substantially unable to select and control information pieces provided by various web sites via the Internet.

SUMMARY OF THE INVENTION

In view of the above-mentioned problems, an object of the present invention is to provide a controller capable of flexibly conducting remote control on a variety of electronic appliances without a remote controlling device manipulated in the hands of a user.

In order to accomplish the object, a first aspect of the present invention provides a controller for controlling an electronic appliance having a display. The controller has a video camera configured to photograph an operator who is in front of the display; a mirror image converter configured to convert an image of the operator photographed by the video camera into a mirror image and output a mirror image signal representative of the mirror image; an operational image generator configured to generate an operational image signal representative of an operational image that is displayed on the display and is used by the operator to make the electronic appliance perform a desired operation; a mixer configured to mix the mirror image signal with the operational image signal; a detector configured to detect that the operator displayed on the display has pointed to the operational image displayed on the display, the operator and operational image being displayed on the display according to the mixed signals from the mixer; and a controlling unit configured to detect whether or not the operator has carried out an operation with respect to the displayed operational image while the detector is indicating that the operator has pointed to the displayed operational image, and if detecting that the operator has carried out an operation with respect to the displayed operational image, control the electronic appliance according to an operation that is determined from a position of the operational image where the operator has pointed to. The detector has a color filter configured to extract a specific-color area from the mirror image signal, the specific-color area corresponding to a hand of the operator pointing to the displayed operational image.

According to the first aspect of the present invention, the video camera photographs an operator. The photographed image is converted into a mirror image and is mixed or overlapped with an operational image containing operation buttons. The mixed images are displayed on the display. The operator may perform a selecting operation with respect to the displayed operational image. For example, the operator may move his or her hand displayed on the display onto one of the operation buttons and bend the fingers of the hand at there. This selecting operation is detected by the detector, and a corresponding control operation is carried out with respect to the electronic appliance. This realizes remote control of the electronic appliance without a remote controller. The operational image must be properly prepared according to operations to be carried out or information contents to be manipulated. The first aspect provides a variety of electronic appliances with operational flexibility and remote-control convenience.

According to a second aspect of the present invention, the detector further includes a gradation limiter configured to extract a range of predetermined gradation levels from the mirror image signal; and a synthesizer configured to extract the area corresponding to the hand of the operator according to the extracted specific-color area and the extracted range of predetermined gradation levels.

According to a third aspect of the present invention, the detector further includes a gate configured to replace the mirror image signal excluding the hand corresponding area with a given brightness or color.

A fourth aspect of the present invention provides a controller for controlling an electronic appliance having a display. The controller has a video camera configured to photograph an operator who is in front of the display; a mirror image converter configured to convert an image of the operator photographed by the video camera into a mirror image and output a mirror image signal representative of the mirror image; an operational image generator configured to generate an operational image signal representative of an operational image that is displayed on the display and is used by the operator to make the electronic appliance perform a desired operation; a mixer configured to mix the mirror image signal with the operational image signal; a detector configured to detect that the operator displayed on the display has pointed to the operational image displayed on the display, the operator and operational image being displayed on the display according to the mixed signals from the mixer; and a controlling unit configured to detect whether or not the operator has carried out an operation with respect to the displayed operational image while the detector is indicating that the operator has pointed to the displayed operational image, and if detecting that the operator has carried out an operation with respect to the displayed operational image, control the electronic appliance according to an operation that is determined from a position of the operational image where the operator has pointed to. The detector includes an extractor configured to extract, from the mirror image signal, an area corresponding to a hand of the operator pointing to the displayed operational image; and a histogram detector configured to detect, in the extracted hand corresponding area, a histogram showing the frequencies of occurrence of gradation levels. The controlling unit detects in the detected histogram whether or not the operator has carried out an operation with respect to the displayed operational image.

According to the fourth aspect of the present invention, the video camera photographs an operator. The photographed image is converted into a mirror image and is mixed or overlapped with an operational image containing operation buttons. The mixed images are displayed on the display. The operator may perform a selecting operation with respect to the displayed operational image. For example, the operator may move his or her hand displayed on the display onto one of the operation buttons and bend the fingers of the hand at there. This selecting operation is detected by the detector, and a corresponding control operation is carried out with respect to the electronic appliance. This realizes remote control of the electronic appliance without a remote controller. The operational image must be properly prepared according to operations to be carried out or information contents to be manipulated. The fourth aspect provides a variety of electronic appliances with operational flexibility and remote-control convenience.

According to a fifth aspect of the present invention, the controller of the fourth aspect detects whether or not the operator has carried out an operation with respect to the displayed operational image according to temporal changes in the detected histogram.

According to a sixth aspect of the present invention, the extractor of the fourth aspect has a color filter configured to extract a specific-color area from the mirror image signal, the specific-color area corresponding to the hand of the operator pointing to the displayed operational image.

According to a seventh aspect of the present invention, the extractor of the sixth aspect further has a gradation limiter configured to extract a range of predetermined gradation levels from the mirror image signal; and a synthesizer configured to extract the hand corresponding area according to the extracted specific-color area and the extracted range of predetermined gradation levels.

According to an eighth aspect of the present invention, the extractor of the seventh aspect further has a gate configured to replace the mirror image signal excluding the hand corresponding area with a given brightness or color.

A ninth aspect of the present invention provides a method of controlling an electronic appliance having a display. The method has photographing an operator who is in front of the display with a video camera; converting an image of the operator photographed by the video camera into a mirror image and outputting a mirror image signal representative of the mirror image; generating an operational image signal representative of an operational image that is displayed on the display and is used by the operator to make the electronic appliance perform a desired operation; mixing the mirror image signal with the operational image signal; detecting that the operator displayed on the display has pointed to the operational image displayed on the display by extracting a specific-color area from the mirror image signal, the specific-color area corresponding to a hand of the operator pointing to the displayed operational image, the operator and operational image being displayed on the display according to the mixed signals; detecting whether or not the operator has carried out an operation with respect to the displayed operational image while it is being detected that the operator has pointed to the displayed operational image; and controlling, if it is detected that the operator has carried out an operation with respect to the displayed operational image, the electronic appliance according to an operation that is determined from a position of the operational image where the operator has pointed to.

According to the ninth aspect of the present invention, the video camera photographs an operator. The photographed image is converted into a mirror image and is mixed or overlapped with an operational image containing operation buttons. The mixed images are displayed on the display. The operator may perform a selecting operation with respect to the displayed operational image. For example, the operator may move his or her hand displayed on the display onto one of the operation buttons and bend the fingers of the hand at there. This selecting operation is detected, and a corresponding control operation is carried out with respect to the electronic appliance. This realizes remote control of the electronic appliance without a remote controller. The operational image must be properly prepared according to operations to be carried out or information contents to be manipulated. The ninth aspect provides a variety of electronic appliances with operational flexibility and remote-control convenience.

According to a tenth aspect of the present invention, the detecting that the operator displayed on the display has pointed to the operational image displayed on the display includes extracting a range of predetermined gradation levels from the mirror image signal; and extracting an area corresponding to the hand of the operator according to the extracted specific-color area and the extracted range of predetermined gradation levels.

According to an eleventh aspect of the present invention, the detecting that the operator displayed on the display has pointed to the operational image displayed on the display further includes replacing the mirror image signal excluding the hand corresponding area with a given brightness or color.

A twelfth aspect of the present invention provides a method of controlling an electronic appliance having a display. The method has photographing an operator who is in front of the display with a video camera; converting an image of the operator photographed by the video camera into a mirror image and outputting a mirror image signal representative of the mirror image; generating an operational image signal representative of an operational image that is displayed on the display and is used by the operator to make the electronic appliance perform a desired operation; mixing the mirror image signal with the operational image signal; detecting that the operator displayed on the display has pointed to the operational image displayed on the display, the operator and operational image being displayed on the display according to the mixed signals; detecting whether or not the operator has carried out an operation with respect to the displayed operational image while it is being detected that the operator has pointed to the displayed operational image; and controlling, if it is detected that the operator has carried out an operation with respect to the displayed operational image, the electronic appliance according to an operation that is determined from a position of the operational image where the operator has pointed to. The detecting that the operator displayed on the display has pointed to the operational image displayed on the display includes extracting, from the mirror image signal, an area corresponding to a hand of the operator pointing to the displayed operational image; and detecting, in the extracted hand corresponding area, a histogram showing the frequencies of occurrence of gradation levels. The detecting whether or not the operator has carried out an operation with respect to the displayed operational image includes detecting in the detected histogram whether or not the operator has carried out an operation with respect to the displayed operational image.

According to the twelfth aspect of the present invention, the video camera photographs an operator. The photographed image is converted into a mirror image and is mixed or overlapped with an operational image containing operation buttons. The mixed images are displayed on the display. The operator may perform a selecting operation with respect to the displayed operational image. For example, the operator may move his or her hand displayed on the display onto one of the operation buttons and bend the fingers of the hand at there. This selecting operation is detected, and a corresponding control operation is carried out with respect to the electronic appliance. This realizes remote control of the electronic appliance without a remote controller. The operational image must be properly prepared according to operations to be carried out or information contents to be manipulated. The twelfth aspect provides a variety of electronic appliances with operational flexibility and remote-control convenience.

According to a thirteenth aspect of the present invention, the detecting whether or not the operator has carried out an operation with respect to the displayed operational image of the twelfth aspect detects whether or not the operator has carried out an operation with respect to the displayed operational image according to temporal changes in the detected histogram.

According a fourteenth aspect of the present invention, the extracting, from the mirror image signal, the area corresponding to the hand of the operator of the twelfth aspect includes extracting a specific-color area from the mirror image signal, the specific-color area corresponding to the hand of the operator pointing to the displayed operational image.

According to a fifteenth aspect of the present invention, the extracting, from the mirror image signal, the area corresponding to the hand of the operator of the fourteenth aspect further includes extracting a range of predetermined gradation levels from the mirror image signal; and extracting the hand corresponding area according to the extracted specific-color area and the extracted range of predetermined gradation levels.

According to a sixteenth aspect of the present invention, the extracting, from the mirror image signal, the area corresponding to the hand of the operator of the fifteenth aspect further includes replacing the mirror image signal excluding the hand corresponding area with a given brightness or color.

The nature, principle and utility of the invention will become more apparent from the following detailed description when read in conjunction with the accompanying drawings.

BRIEF DESCRIPTION OF THE DRAWINGS

In the accompanying drawings:

FIG. 7 is a block diagram showing one of the detectors shown in FIG. 2;

FIG. 8 is a block diagram showing an object extractor of FIG. 7;

FIGS. 21A and 21B each show a distribution of gradation-level frequencies and an average picture level (APL) at time T4 of FIG. 14;

FIG. 29 shows an operation carried out when the image of an operator photographed by video camera is too small;

DETAILED DESCRIPTION OF EMBODIMENTS

An embodiment of the present invention will be explained with reference to the accompanying drawings.

Figure 1:
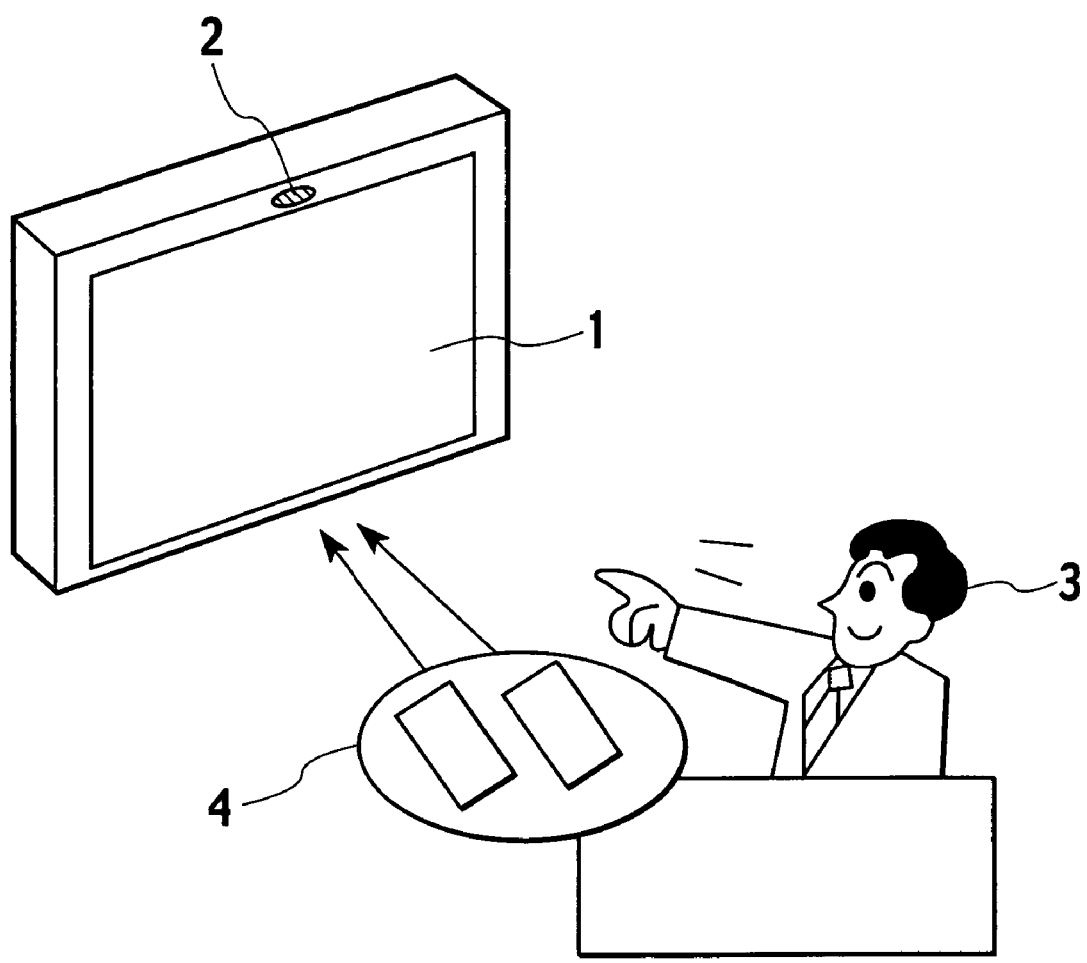
FIG. 1 roughly shows a method of controlling an electronic appliance according to the present invention.

FIG. 1 shows the difference between an operation using a remote controller according to a related art and an operation according to the present invention. Viewer (user) 3 operates a television receiver 1. According to the related art, the user 3 must hold the remote controller 4, direct the remote controller 4 toward the television receiver 1, and push a key of required function on the remote controller 4. Without the remote controller 4, the user 3 cannot operate the television receiver 1, and therefore, must frequently experience inconvenience.

On the other hand, the present invention provides the television receiver 1 with a video camera 2. The video camera 2 photographs the user 3. From the image provided by the video camera 2, an operation conducted by the user 3 is recognized and an operation corresponding to the recognized operation is carried out with respect to the television receiver 1 or any other device connected to the television receiver 1. The operation conducted by the user 3 may be a physical (hand, foot, face, or the like) motion to select a button in a menu displayed on the television receiver 1. If the ambient lighting of the television receiver 1 is dim, a device such as a pen light may be employed to substitute for the physical part of the user. In this embodiment, a most practical way, i.e., a hand motion is employed to control the television receiver 1.

Figure 2:
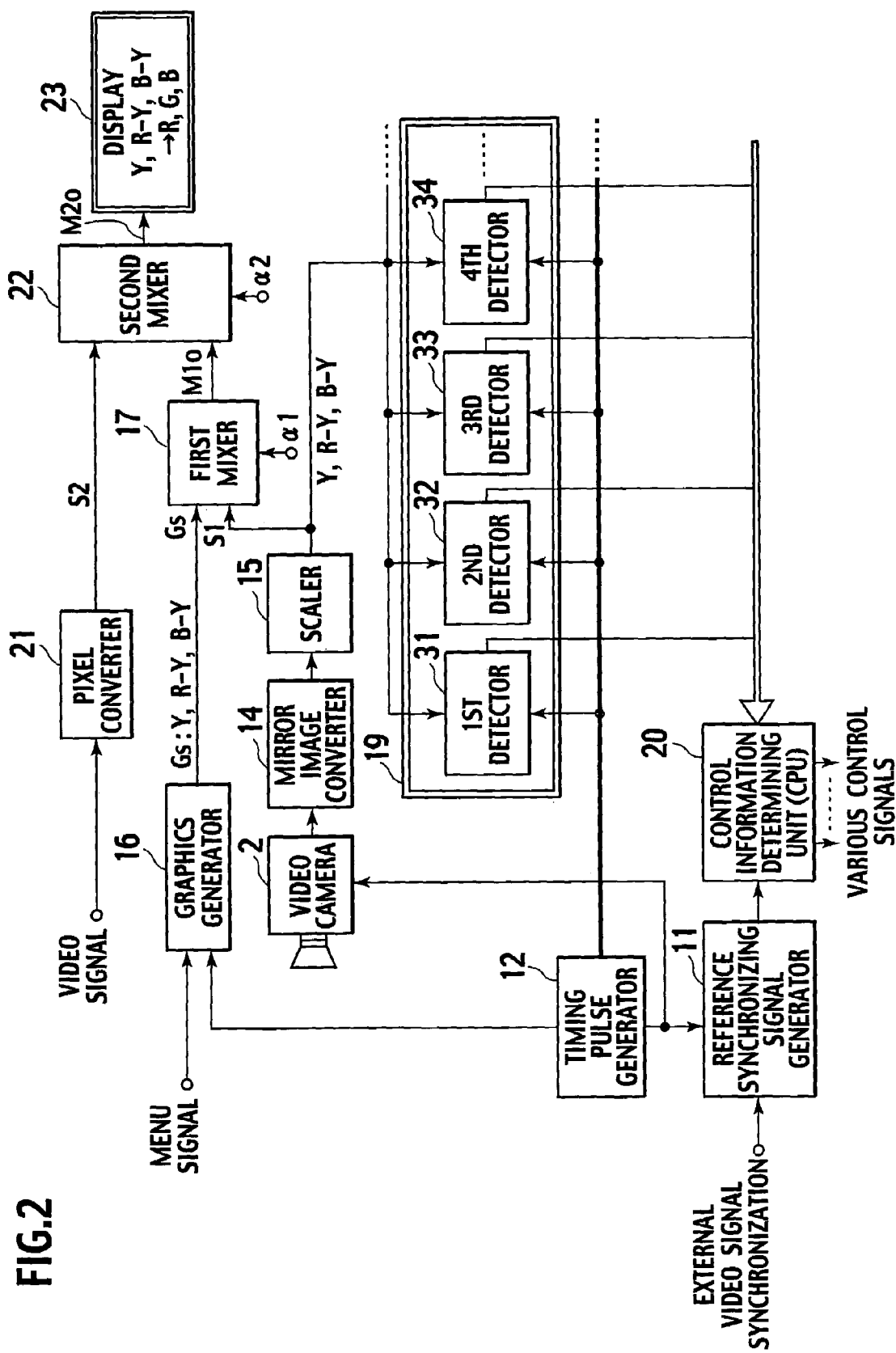
FIG. 2 is a block diagram showing a controller for controlling an electronic appliance (television receiver) according to an embodiment of the present invention.

FIG. 2 is a block diagram showing a television receiver 1 and a controller for controlling the same according to an embodiment of the present invention. The television receiver 1 has a reference synchronizing signal generator 11, a timing pulse generator 12, a graphics generator 16, a video camera 2, a mirror image converter 14, a scaler 15, a first mixer 17, a pixel converter 21, a second mixer 22, a display 23, a detector unit 19, and a control information determining unit (realized in a CPU, and therefore, hereinafter referred to as CPU) 20.

The reference synchronizing signal generator 11 generates horizontal periodic pulses and vertical periodic pulses as reference signals for the television receiver 1. When receiving a television broadcasting signal or a video signal from an external device, the generator 11 generates pulses synchronized with a synchronizing signal of the input signal. The timing pulse generator 12 generates pulse shaving optional phases and widths in horizontal and vertical directions for the respective blocks of FIG. 2. The video camera 2 is arranged on the front side of the television receiver 1 as shown in FIG. 1 and photographs the user 3 or an object in front of the television receiver 1. The video camera 2 outputs a brightness (Y) signal and color difference (R-Y, B-Y) signals in synchronization with the horizontal and vertical periodic pulses provided by the reference synchronizing signal generator 11. According to this embodiment, the number of pixels of an image photographed by the video camera 2 is equal to the number of pixels of the display 23. If they are not equal to each other, a pixel converter will be required.

Figure 3:
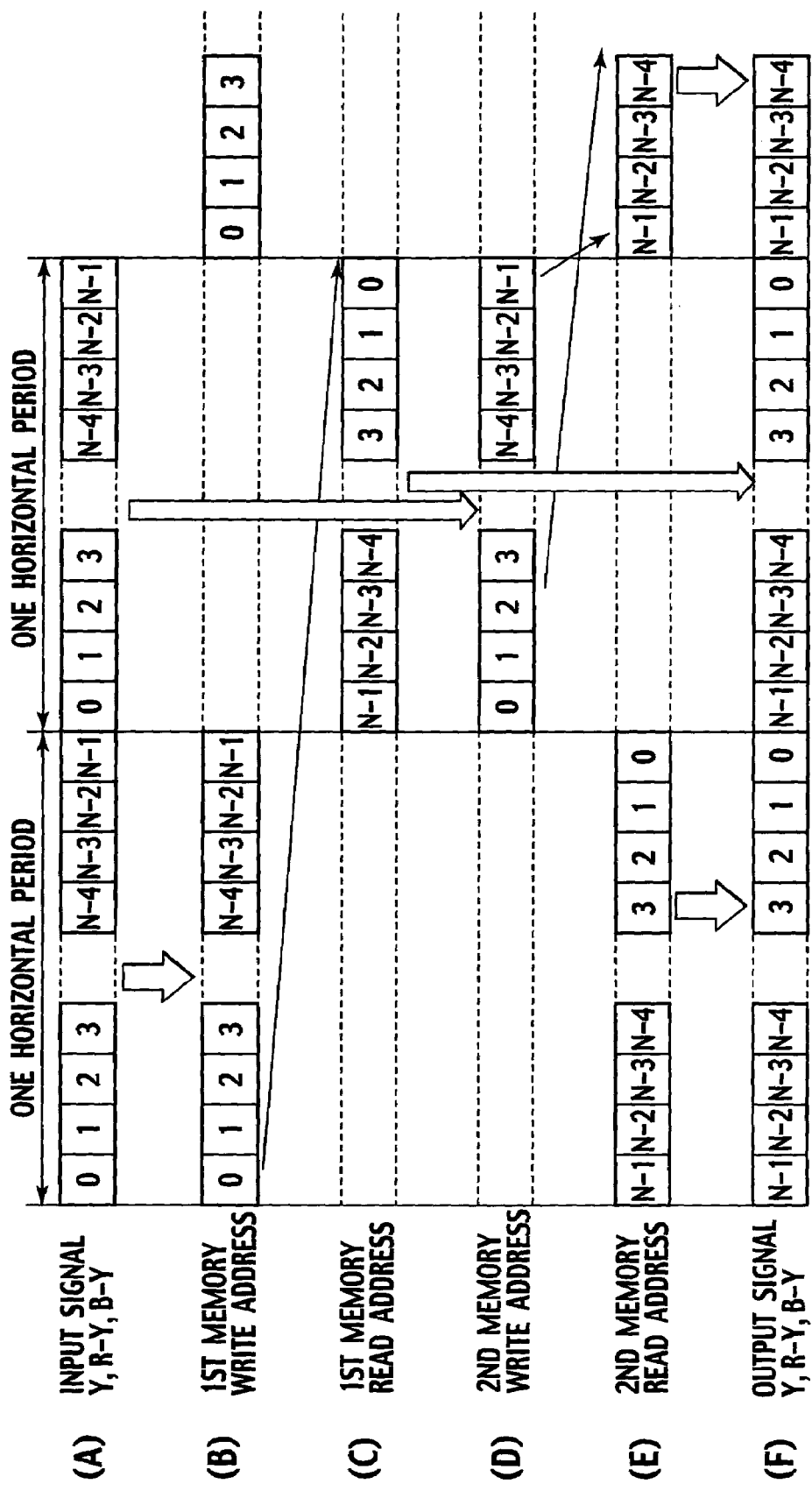
FIG. 3 shows a method of converting an image into a mirror image.

The mirror image converter 14 horizontally inverts an image from the video camera 2 and provides a mirror image, which is displayed on the display 23. Accordingly, if the video camera 2 provides an image of a character, it is horizontally inverted like a character image reflected from a mirror. The horizontal inversion is easy to achieve by manipulating addresses with the use of first and second memories that are written and read at horizontal intervals as shown in FIG. 3. In FIG. 3, one horizontal period covers N pixels. At intervals of horizontal periods, input signals are alternately written into the two memories at addresses 0 to N−1. Write and read operations on each memory are exclusively carried out. A read operation reads the addresses in order of N−1 to 0, to horizontally invert the image. Although this embodiment employs memories to horizontally invert an image, this does not limit the present invention. If the display 23 is a CRT (cathode ray tube), a horizontal deflecting operation may be reversely carried out to horizontally invert an image. In this case, other images or graphics to be mixed with an image from the video camera 2 must be horizontally inverted in advance.

The scaler 15 adjusts the size of the image photographed by the video camera 2. Under the control of the CPU 20, the scaler 15 two-dimensionally adjusts an expansion ratio or a contraction ratio. Instead of expansion or contraction, the scaler 15 may adjust horizontal and vertical phases. The details of this will be explained later.

The graphics generator 16 forms a menu according to a menu signal transferred from the CPU 20. If the menu signal is a primary color signal involving R (red), G (green), and B (blue) signals, the graphics generator 16 generates, from the primary color signal, a Y (brightness) signal and color difference (R-Y, B-Y) signals, which are synthesized or mixed with an image signal in a later stage. The number of planes of the generated graphics is optional. In this embodiment, the number of planes is one. The number of pixels of the generated graphics according to this embodiment is equal to the number of pixels of the display 23. If they are not equal to each other, a pixel converter must be inserted to equalize them.

The first mixer 17 mixes an output signal Gs of the graphics generator 16 with an output signal S1 of the scaler 15 according to a control value α1 that controls a mixing ratio. The first mixer 17 provides an output signal M1o as follows:

$$M1o = \alpha1 \cdot S1 + (1-\alpha1) \cdot Gs$$

The control value α1 is a value between 0 and 1. As the control value α1 increases, a proportion of the scaler output signal S1 increases and a proportion of the graphics generator output signal Gs decreases. The mixer is not limited to the one explained above. The same effect will be achievable with any mixer that receives two systems of signal information.

The detector unit 19 consists of a first detector 31, a second detector 32, a third detector 33, a fourth detector 34, and the like. The number of the detectors contained in the detector unit 19 is not particularly limited but it is dependent on the number of push buttons contained in the menu generated by the graphics generator 16. Here, the push buttons resemble operation buttons that are displayed on a computer screen and are clicked with a mouse. The push buttons represent control operations, respectively.

The CPU 20 analyzes data provided by the detector unit 19 and outputs various control signals. Operations of the CPU 20 are carried out by software. Algorithms of the software will be explained later. To carry out various operations, this embodiment employs hardware (functional blocks) and software (in the CPU). Classification of operations into hardware and software of this embodiment does not limit the present invention.

The pixel converter 21 converts pixel counts, to equalize the number of pixels of an external input signal with the number of pixels of the display 23. The external input signal is a signal coming from the outside of the television receiver 1, such as a broadcasting television signal (including a data broadcasting signal) or a video (VTR) signal. From the external input signal, horizontal and vertical synchronizing signals are extracted, and the reference synchronizing signal generator 11 provides synchronized signals. The details of a synchronizing system for external input signals will not be explained here because it is not essential for the present invention.

The second mixer 22 has a function similar to that of the first mixer 17. The second mixer 22 mixes the output signal M1o of the first mixer 17 with an output signal S2 of the pixel converter 21 at a control value $\alpha 2$ that controls a mixing ratio. The second mixer 22 provides an output signal M2o as follows:

$$M2o = \alpha 2 \cdot M1o + (1-\alpha 2) \cdot S2$$

The control value $\alpha 2$ is a value between 0 and 1. As the control value $\alpha 2$ increases, a proportion of the first mixer output signal M1o increases and a proportion of the pixel converter output signal S2 decreases. The mixer 22 is not limited to the one explained above. The same effect will be provided with any mixer that receives two systems of signal information.

The display 23 may be a CRT (cathode ray tube), an LCD (liquid crystal display), a PDP (plasma display panel), a projection display, or the like. The display 23 may employ any proper display method. The display 23 receives a brightness signal Y and color difference signals R-Y and B-Y, converts them into R, G, and B primary color signals, and displays an image.

Figure 4:
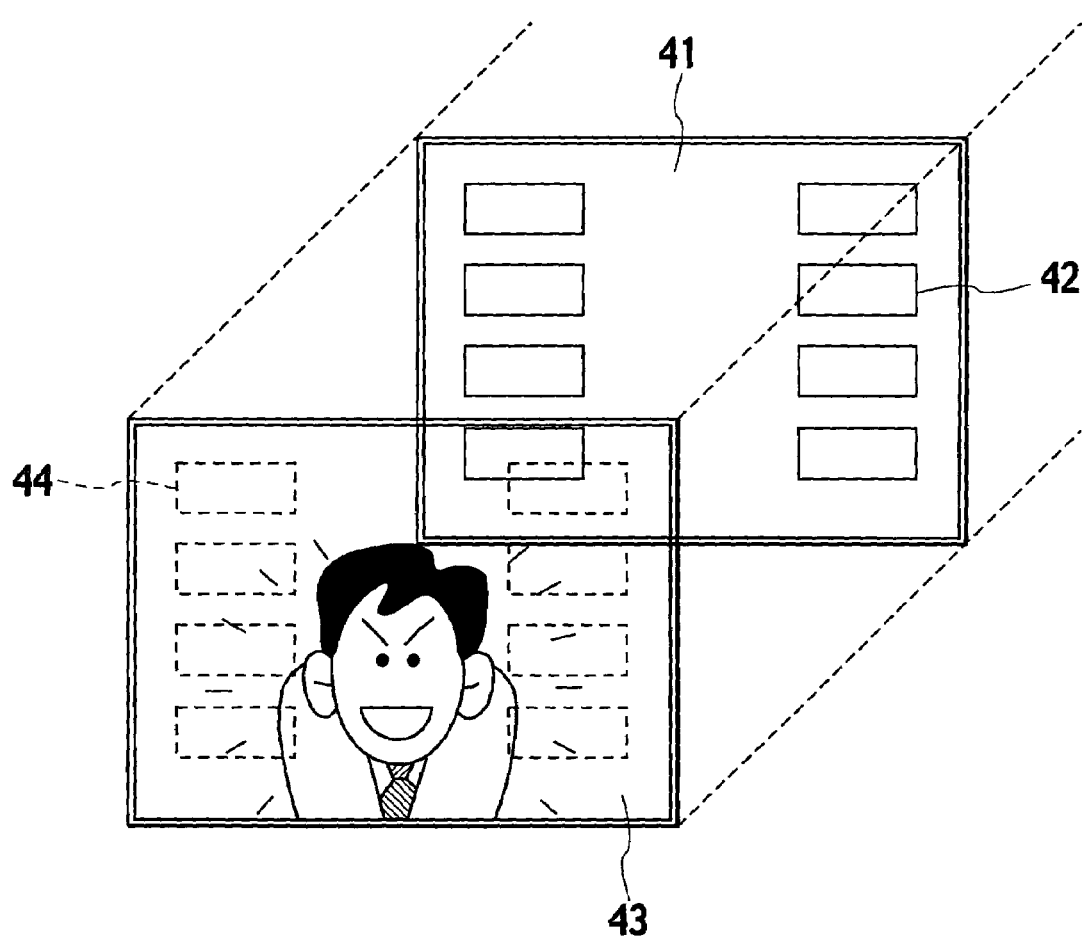
FIG. 4 shows an image of an operator and an operational image.

Operation of the television receiver 1 having the above-mentioned structure, as well as operation conducted by a user will be explained. FIG. 4 shows a graphics image 41 and a scaler output image 43. The scaler output image 43 is a mirror image of an image photographed by the video camera 2. The number of pixels of the scaler output image 43 is equalized with the number of pixels of the graphics image 41 through a scaling process. Signals representative of the images 41 and 43 are mixed in the first mixer 17. The graphics image 41 provides a menu on which the user performs a control operation. Each square 42 in the graphics image 41 is a push button (operation button). The scaler output image 43 is a mirror image of the user photographed by the video camera 2. In the scaler output image 43, each square 44 depicted with a dotted line represents a detection area of the detector unit 19 composed of the detectors 31, 32, and the like. The squares 44 in the scaler output image 43 are arranged at the same positions as the push buttons 42 in the graphics image 41.

Figure 5:
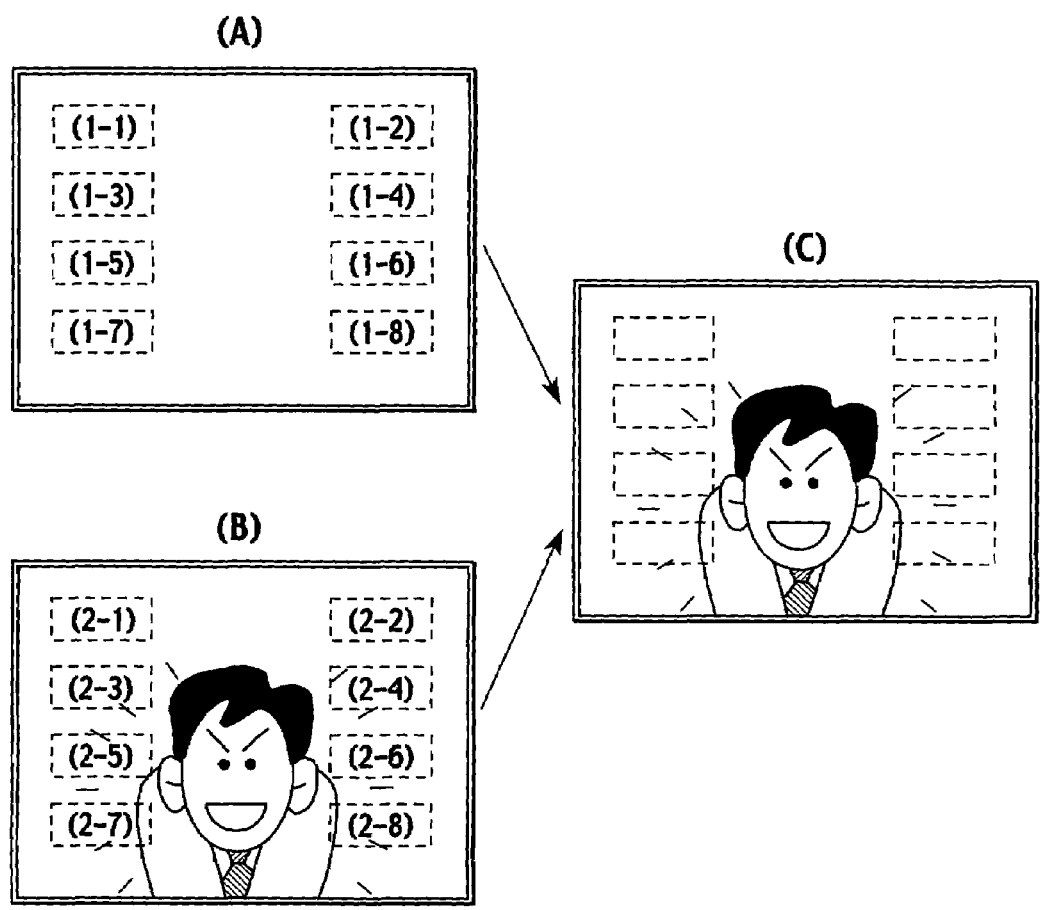
FIG. 5 shows the overlaying (mixing) of an operator' image and an operational image.

FIG. 5 shows a mixing process carried out in the first mixer 17. In FIG. 5, an image (A) shows the control menu generated by the graphics generator 16. The menu includes push buttons (1-1) to (1-8). An image (B) of FIG. 5 is the user's image that has been photographed by the video camera 2, mirror-converted, and scaled. The user's image (B) includes detection areas (2-1) to (2-8) corresponding to the detectors of the detector unit 19, respectively. An image (C) of FIG. 5 is an image formed in the first mixer 17 by mixing the images (A) and (B) with a control value $\alpha 1$ representing a mixing ratio. In proportion to the control value $\alpha 1$, the brightness and contrast of the image (C) becomes lower than those of the image (B).

The user's mirror image and control menu are overlaid and are displayed on the display 23. As a result, the user can observe each motion of the user on the control menu displayed on the display 23. To conduct a control operation, the user watches the display 23 and moves the hand (body) of the user so as to touch a target one of the push buttons displayed on the display 23. Namely, the user moves his or her hand onto one of the displayed push buttons and conducts a control operation. Pushing the push button is detected by detecting the hand in the detection area corresponding to the push button. Then, the CPU 20 outputs a control signal corresponding to a control operation assigned to the push button manipulated by the user. At this time, the push button in question may be displayed in a different shape and/or a different color, to indicate that the user's operation has been recognized. For example, the pushed push button may be changed into a pushed shape.

Figure 6:
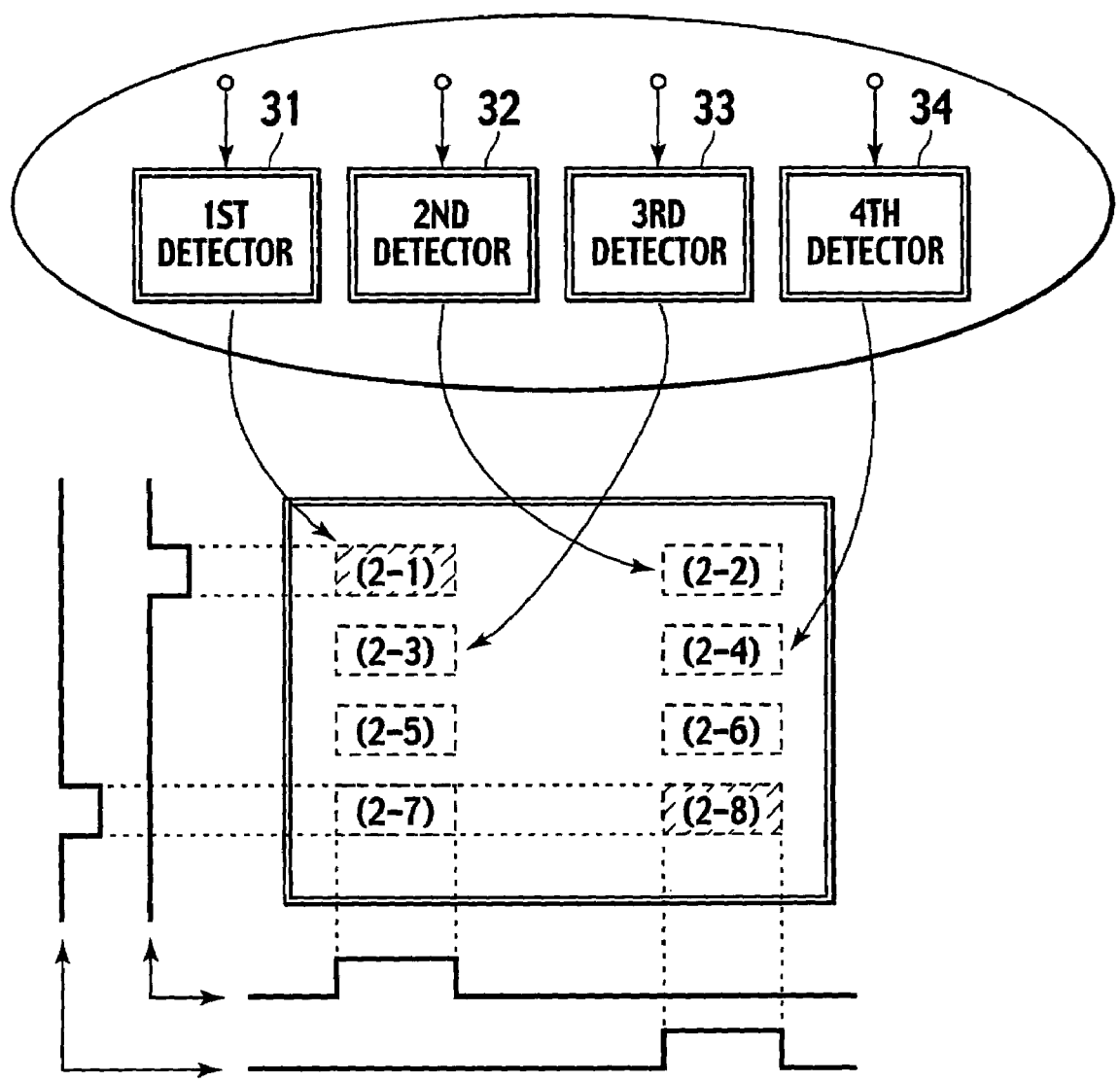
FIG. 6 shows relationships between detectors shown in FIG. 2 and detected areas on a display.

FIG. 6 shows relationships between the detection areas (2-1) to (2-8) set in the image from the video camera 2 and the detectors 31 to 34 in the detector unit 19. FIG. 6 also shows horizontal and vertical timing pulses to identify the detection areas (2-1) and (2-8).

FIG. 7 shows the details of one of the detectors 31 to 34. The detector has an object extractor 51, a timing gate 52, and an object characteristics detector 53. The timing gate 52 controls the passage of an image signal from the video camera 2 according to the timing pulses shown in FIG. 6. A portion of the image signal the timing gate 52 passes is a detection area indicated with a dotted square in FIG. 6. The passed signal portion is subjected to various filtering processes to extract the hand of the user photographed by the video camera 2.

Figure 9:
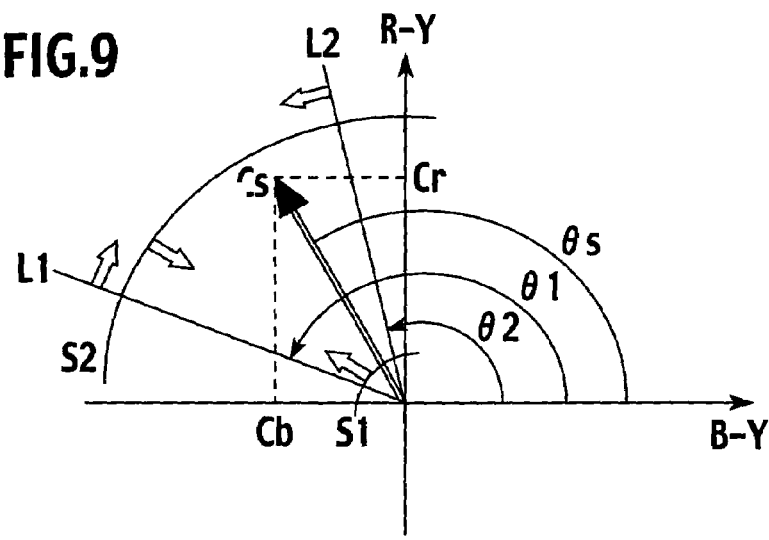
FIG. 9 shows the hue and degree of saturation of an object to be extracted by the object extractor.

The object extractor 51 has a filter suitable for filtering the characteristics of an objective image. According to this embodiment, the object extractor 51 detects the hand of the user by filtering a skin color. FIG. 8 shows the details of the object extractor 51. The object extractor 51 has a color filter 71, a gradation limiter 72, a synthesizer 73, and an object gate 74. The color filter 71 will be explained with reference to FIG. 9 that shows a color difference plane with an ordinate representing an R-Y axis and an abscissa representing a B-Y axis. Every color signal in television signals is expressible with a vector on coordinates of FIG. 9 and can be evaluated from polar coordinates. The color filter 71 limits the hue and color depth (degree of saturation) of a color signal consisting of color difference signals. In FIG. 9, a hue is expressed with a left-turn angle with the B-Y axis in the first quadrant serving as a reference (zero degrees). The degree of saturation is a scalar quantity of a vector. The origin of the color difference plane has a saturation degree of 0 with no color. The degree of saturation increases as it separates away from the origin, to increase the depth of color.

In FIG. 9, the color filter 71 passes a hue that falls in a range smaller than an angle of $\theta 1$ that defines an equal hue line L1 and larger than an angle of $\theta 2$ that defines an equal hue line L2. Also, the color filter 71 passes a color depth that falls in a range smaller than an equal saturation degree line S2 and larger than an equal saturation degree line S1. This range in the second quadrant corresponds to a skin-color range, i.e., the color of a hand to be extracted according to this embodiment. This, however, does not limit the present invention. The color filter 71 detects whether or not color difference signals (R-Y, B-Y) from the video camera 2 are within the range surrounded by the equal hue lines and equal saturation degree lines. To achieve this, an angle and a degree of saturation must be calculated from the color difference signals.

Figure 10:
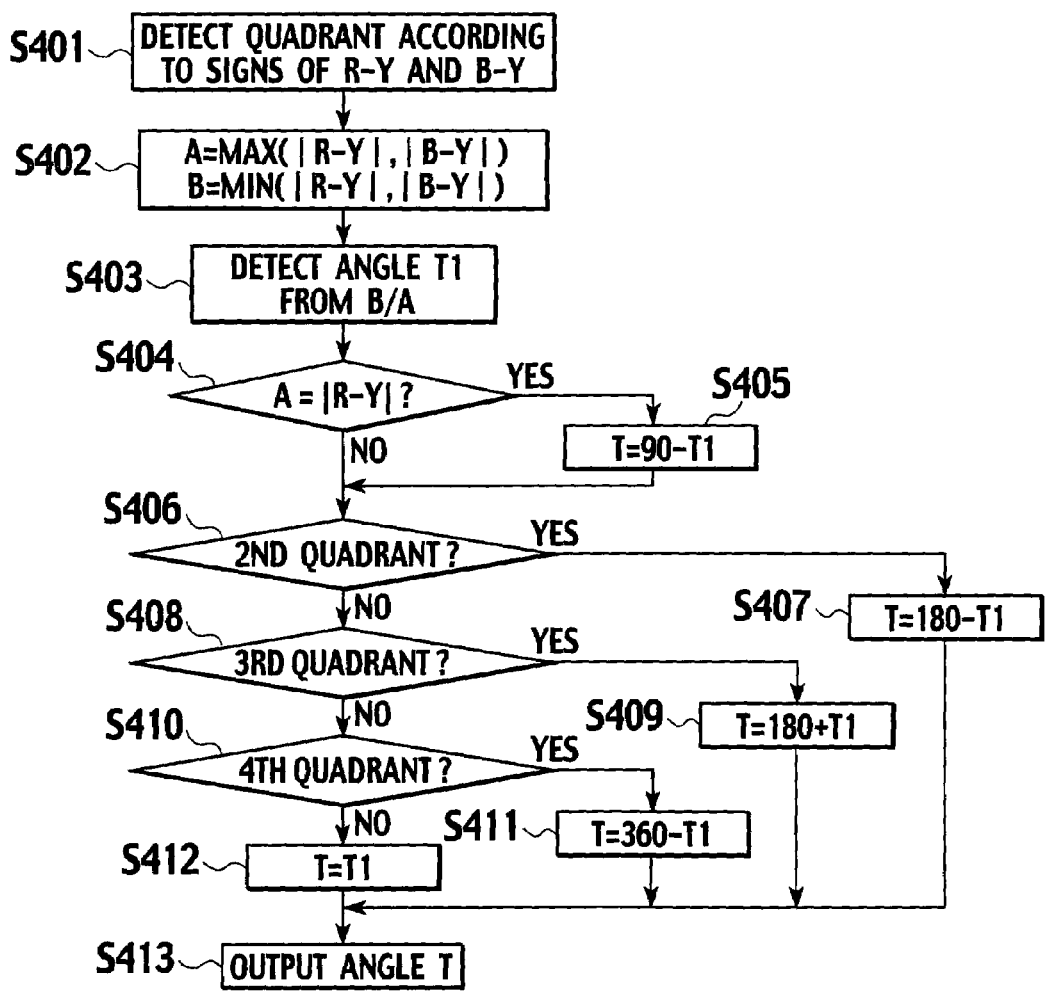
FIG. 10 is a flowchart showing a process of computing a hue from color difference signals.

The angle calculation is carried out as shown in FIG. 10. Steps shown in FIG. 10 calculate, for each input pixel, an angle formed in the color difference plane of FIG. 9. The angle calculation steps shown in FIG. 10 may be realized by software or hardware. According to this embodiment, the steps of FIG. 10 are realized by hardware. In FIG. 10, step S401 refers to the signs of color difference signals R-Y and B-Y of each input pixel and detects a quadrant in the color difference plane where the hue of the input pixel is present. Step S402 finds a larger one of the absolute values of the color signals R-Y and B-Y as A and a smaller one thereof as B.

Step S403 detects an angle T1 from B/A. As is apparent in step S402, the angle T1 is within the range of 0° to 45°. The angle T1 is calculable from a broken line approximation or a ROM table. Step S404 determines whether or not A is equal to |R-Y|, i.e., whether or not |R-Y|>|B-Y|. If |R-Y|>|B-Y| is not true, step S406 is carried out. If |R-Y|>|B-Y| is true, step S405 replaces the angle T1 with (90-T1). Then, $\tan^{-1}((R-Y)/(B-Y))$ is calculated.

The reason why step S403 sets the range of 0° to 45° for detecting the angle T1 is because the inclination of the curve $\tan^{-1}((R-Y)/(B-Y))$ sharply increases to such an extent that is improper for the angle calculation.

Step S406 employs the quadrant data detected in step S401 and determines if it is the second quadrant. If it is the second quadrant, step S407 calculates T=180-T1. If it is not the second quadrant, step S408 determines whether or not it is the third quadrant. If it is the third quadrant, step S409 calculates T=180+T1. If it is not the third quadrant, step S410 checks to see if it is the fourth quadrant. If it is the fourth quadrant, step S411 calculates T=360-T1. If it is not the fourth quadrant, i.e., if it is the first quadrant, step S412 sets T=T1. At the end, step S413 outputs, for the pixel, the angle T in the color difference plane of FIG. 9.

With the steps mentioned above, an angle of input color difference signals R-Y and B-Y in the color difference plane is found in the range of 0° to 360°. Steps S404 to S412 correct the angle T1 detected in step S403 to an angle T. Steps S404 to S411 correct the angle T1 according to a proper one of the first to fourth quadrants.

A color depth or a saturation degree is calculated as follows:

$$Vc = \text{sqrt}(Cr \times Cr + Cb \times Cb)$$

where Cr is an R-Y axis component of a color signal and Cb is a B-Y axis component, as shown in FIG. 9. "sqrt( )" is an operator to calculate a square root.

This process may be carried out by software or hardware. The multiplication and square root operations are difficult to realize by hardware and involve a large number of steps if realized by software. Accordingly, the above-mentioned process may be approximated as follows:

$$Vc = \max(|Cr|, |Cb|) + 0.4 \times \min(|Cr|, |Cb|)$$

where max(|Cr|, |Cb|) is an operation to select a larger one of |Cr| and |Cb|, min(|Cr|, |Cb|) is an operation to select a smaller one of |Cr| and |Cb|, and Vc is a scalar quantity of a vector to indicate a saturation degree in this embodiment.

Thereafter, it is evaluated whether or not the angle (hue) T and saturation degree Vc are within the range of equal hue line angles θ1 to θ2 and within the range of equal saturation angle (color depth) lines S1 to S2. The color filter 71 of FIG. 8 passes any signal that is within these ranges.

Figure 11:
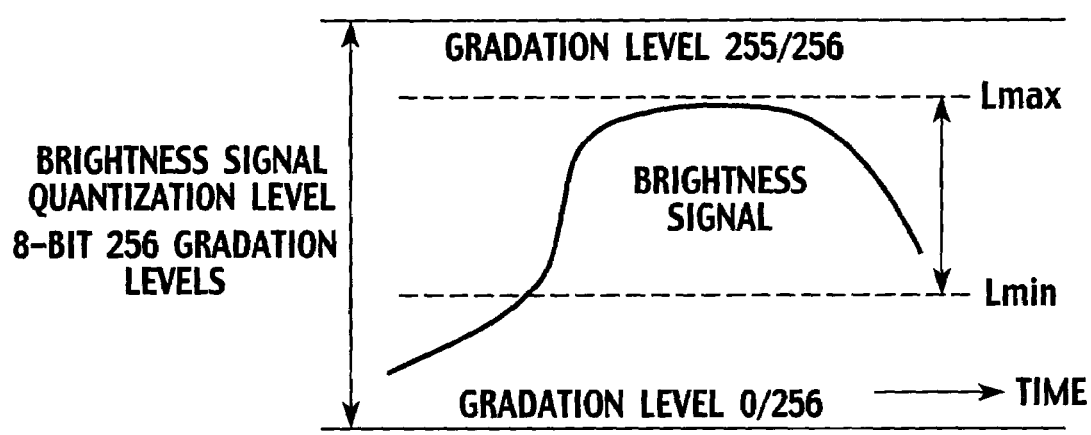
FIG. 11 shows a brightness signal level of an object to be extracted by the object extractor.

The gradation limiter 72 of FIG. 8 is to limit specific gradation levels in a brightness signal as shown in FIG. 11. In the case of an 8-bit digital signal, there are 256 gradation levels ranging from 0 to 255. To limit a range of gradation levels, a maximum level Lmax and a minimum level Lmin are set to pass a brightness signal within this range.

The synthesizer 73 receives signals from the color filter 71 and gradation limiter 72 and provides an intraregional pulse. Namely, if there are both (AND) the signal passed through the specific filter 71 and signal passed through the gradation limiter 72, the synthesizer 73 provides a high-level pulse.

The intraregional pulse from the synthesizer 73 is supplied to the object gate 74. If the intraregional pulse is at high level, the object gate 74 passes the brightness signal and color difference signals. If the intraregional pulse is at low level, the object gate 74 blocks the input signals and outputs signal of predetermined values. According to this embodiment, the signals of predetermined values are a black-level brightness signal and color difference signals of saturation degree of zero.

The color filter 71 limits the hue (angle) and saturation degree of a color signal, and the object extractor 51 further limits the signal from the color filter 71 according to the level of a brightness signal. When selecting a skin color, the color filter 71 may limit the hue and saturation degree of a color signal. The skin color, however, varies depending on, for example, tanned states or races. To cope with various skin colors, the embodiment adjusts the range of hues, the range of saturation degrees, and the range of gradation levels, thereby detecting a human hand. Although the detecting object of this embodiment is a human hand, any other object may be detected by properly adjusting parameters such as hues and gradation levels.

Figure 12:
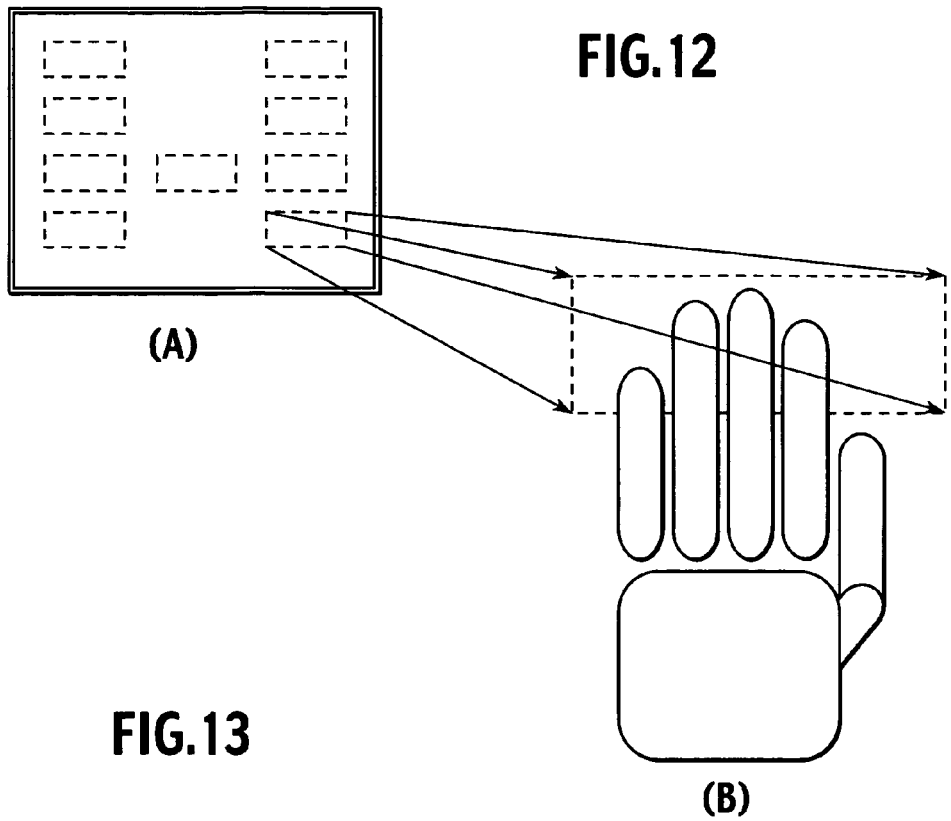
FIG. 12 shows a hand and a displayed operation menu having operation buttons one of which is pointed with the hand.
Figure 13:
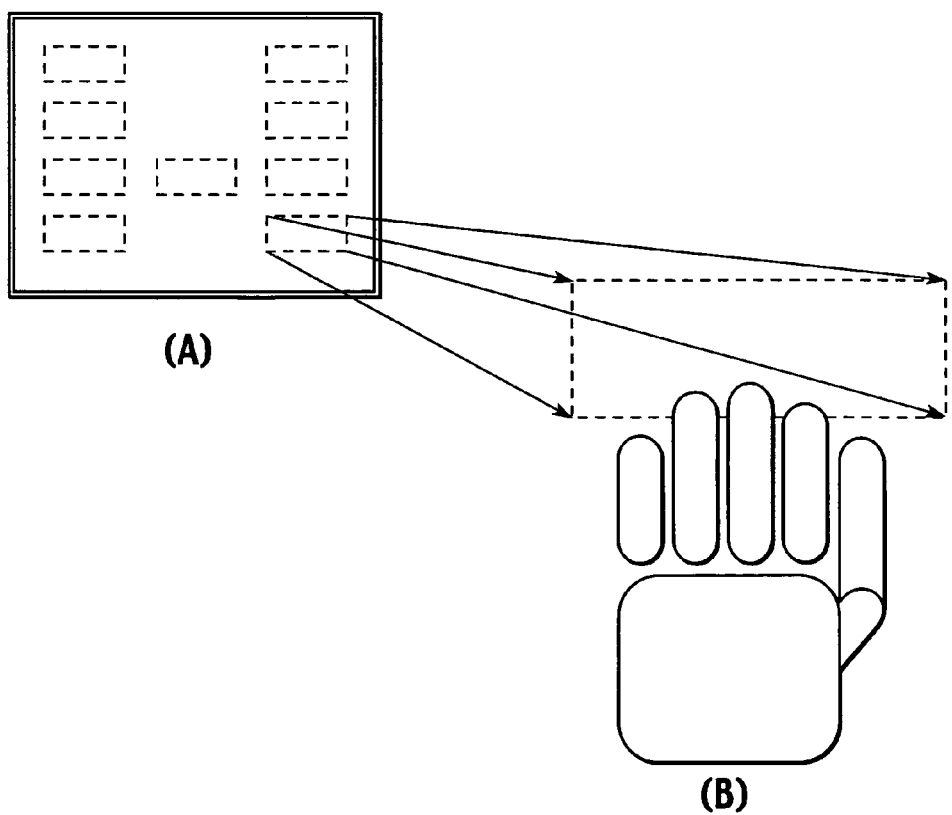
FIG. 13 shows the hand and operation menu of FIG. 12, the fingers of the hand being bent on the one operation button.

Each image (A) in FIGS. 12 and 13 shows an image provided by the video camera 2 and push button areas (dotted rectangles) set in the image. According to the present invention, the user holds a hand against the video camera 2, and motions of the hand are detected as control information. Each image (B) in FIGS. 12 and 13 shows a motion of the hand of the user. The image (B) of FIG. 12 shows that the user holds his or her hand against one of the push buttons. The image (B) of FIG. 13 shows that the user bends the fingers of the hand. According to this embodiment, bending fingers twice is recognized as pressing a push button. This, however, does not limit the present invention. For example, only holding a hand against a push button, or bending fingers once, or thrice, or more may be recognized as pressing a push button.

Figure 14:
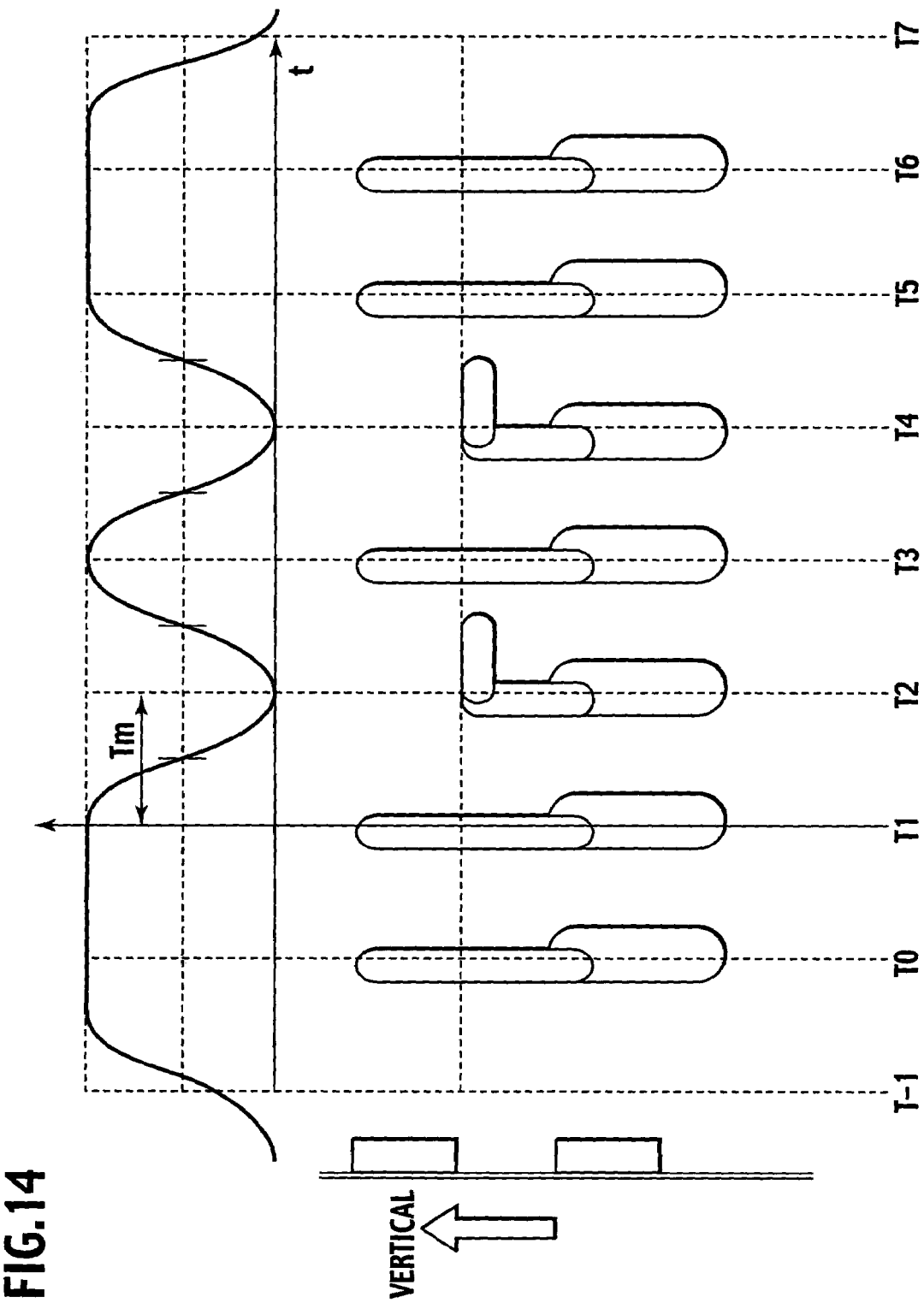
FIG. 14 is a time chart showing changes in the shape of a displayed hand when the fingers of the hand are bent twice.

With reference to FIG. 14, a hand operation will be explained along a time axis. A period Tm is a period between a finger extended state and a finger bent state. For the sake of clarity of explanation, FIG. 14 employs the period Tm as a minimum time unit and sets time points T0, T1, T2, and the like along the time axis.

At time T-1, no hand is held against the display 23. At time T0, the user holds a hand over a target push button. From time T1, the user keeps the hand holding state for the period Tm. At time T2, the user bends the fingers of the hand. At time T3, the user extends the fingers. At time T4, the user again bends the fingers. At time T5, the user again extends the fingers. From time T6, the user keeps the finger extended state for the period Tm. At time T7, the user withdraws the hand.

These are hand motions carried out on the push button. A waveform depicted at an upper part of FIG. 14 shows changes in the area of a projected image of the hand on the push button. Analyzing the waveform may identify the hand motions and recognize a control operation corresponding to the hand motions.

Figure 15A:
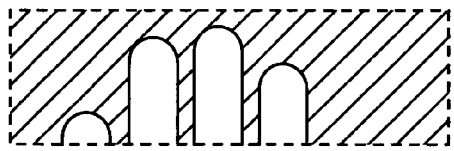
FIGS. 15A and 15B each show a hand overlaid on an operation button.
Figure 15B:
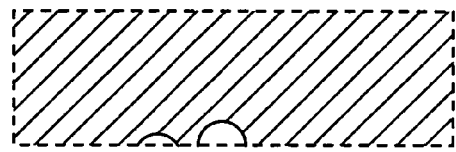

FIGS. 15A and 15B show images formed from output signals of the object extractor 51. The timing gate 52 passes a push button area in the signals from the object extractor 51 and blocks the other area. Each signal supplied to the timing gate 52 has a color filtered through the color filter 71 that passes only a skin color. Each signal supplied to the timing gate 52 is also limited in gradation levels. Namely, each signal to the timing gate 52 represents a limited area with the remaining area being colored black (a brightness signal of zero and a color signal of zero). Based on the signals from the object extractor 51, the timing gate 52 limits a push button area, to provide an image containing a hand area and a black background area (hatched part) as shown in FIGS. 15A and 15B. FIG. 15A shows a finger extended state and FIG. 15B shows a finger bent state. Coloring an area other than the hand area black is to improve detecting accuracy in later stages. The area other than the hand area may be provided with an optimum gradation or color level depending on an object to be detected.

From FIGS. 15A and 15B, the characteristics of the image are detected. The object characteristics detector 53 of FIG. 7 has functional blocks to detect various characteristics in an image. Namely, the object characteristics detector 53 has a histogram detector 61, an average brightness level (average picture level (APL)) detector 62, a high-frequency detector 63, a minimum value detector 64, and a maximum value detector 65. There are other characteristics specific to a given image. According to this embodiment, characteristics detected by the detectors 61 to 65 are used to identify a hand and recognize an operation carried out by the hand.

According to this embodiment, the detectors 61 to 65 are made of hardware to detect the state of a framed object in a space, processes the detected state into unit data (for each field or each frame corresponding to a vertical period), and supplies the data to a bus of the CPU 20. The CPU 20 stores the data as software variables and processes them.

The histogram detector 61 separates gradation levels into eight stepwise groups and counts the number of pixels belonging to each group and provides the CPU 20 with the frequency of each group per field or frame. The APL detector 62 adds up gradation levels of each field or frame, divides the sum by the number of pixels, and provides the CPU 20 with the average of the field or frame. The high-frequency detector 63 employs a spatial filter (two-dimensional filter) to extract high-frequency components, and provides the CPU 20 with the frequencies of the high-frequency components per field or frame. The minimum value detector 64 provides the CPU 20 with a minimum gradation level of a brightness signal of each field or frame. The maximum value detector 65 provides the CPU 20 with a maximum gradation level of a brightness signal of each field or frame.

The CPU 20 stores the received data as variables and processes them with software. According to this embodiment, operations mentioned below are carried out by software.

FIGS. 16A to 23B show output data from the histogram detector 61 and APL detector 62. Each figure shows a gradation level histogram and an average brightness (APL). The APL is indicated with an arrow whose size represents the magnitude of the APL. An ordinate indicates the frequency of a gradation level group and an abscissa indicates gradation (brightness) levels separated into eight stepwise groups. A case 1 (FIGS. 16A to 23A) and a case 2 (FIGS. 16B to 23B) differ from each other in the brightness of a hand. In the case 1, the frequency of a specific gradation level group is particularly high. In the case 2, the frequencies of two gradation level groups are high. The histograms shown in FIGS. 16A to 23B correspond to the time points T-1 to T6 of FIG. 14. Since the object extractor 51 limits an area having a specific skin color and specific gradation levels and colors the remaining part black, each histogram shows high frequencies in a gradation level group corresponding to black and gradation level groups corresponding to the limited gradation levels.

Changes in the histograms and APL values will be explained along the time axis.

Figure 16A:
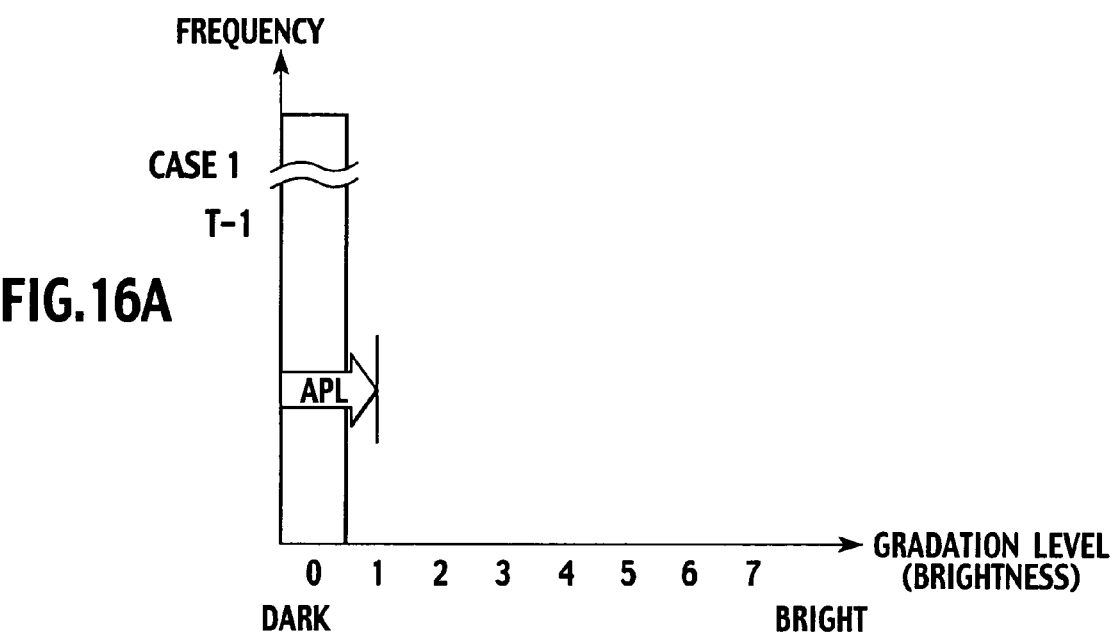
FIGS. 16A and 16B each show a distribution of gradation-level frequencies and an average picture level (APL) at time T-1 of FIG. 14.
Figure 16B:
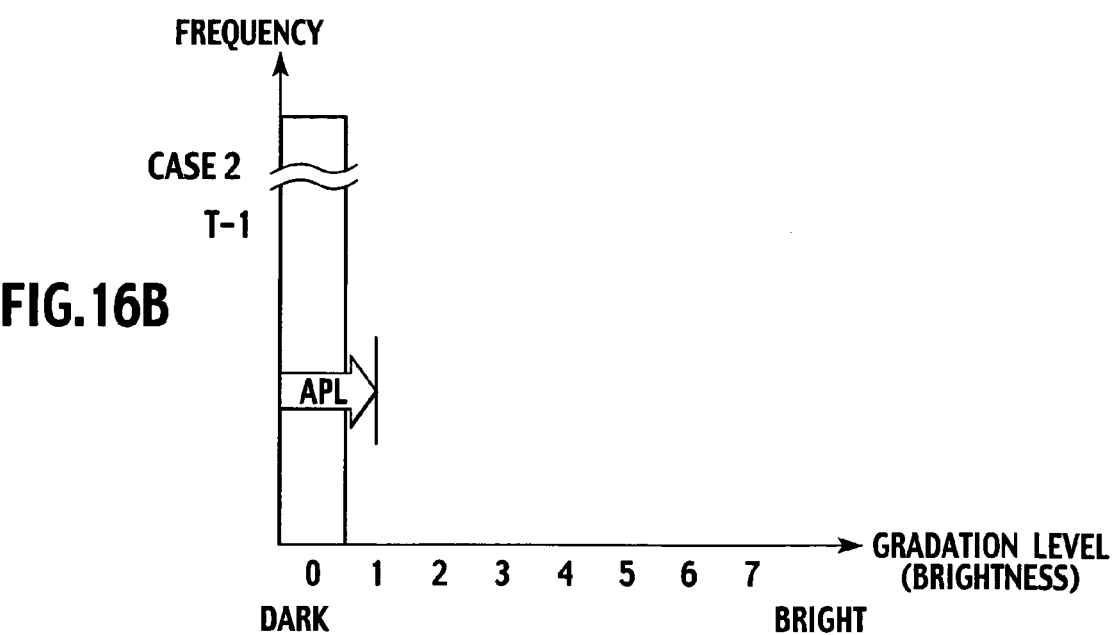

In FIGS. 16A and 16B at time T-1, no hand is held against the display 23. Accordingly, there is no frequency in principle. Frequencies at this time, if any, indicate a skin color that is present in a background photographed by the video camera 2 and has the limited gradation levels. At this time, the APL is low.

Figure 17A:
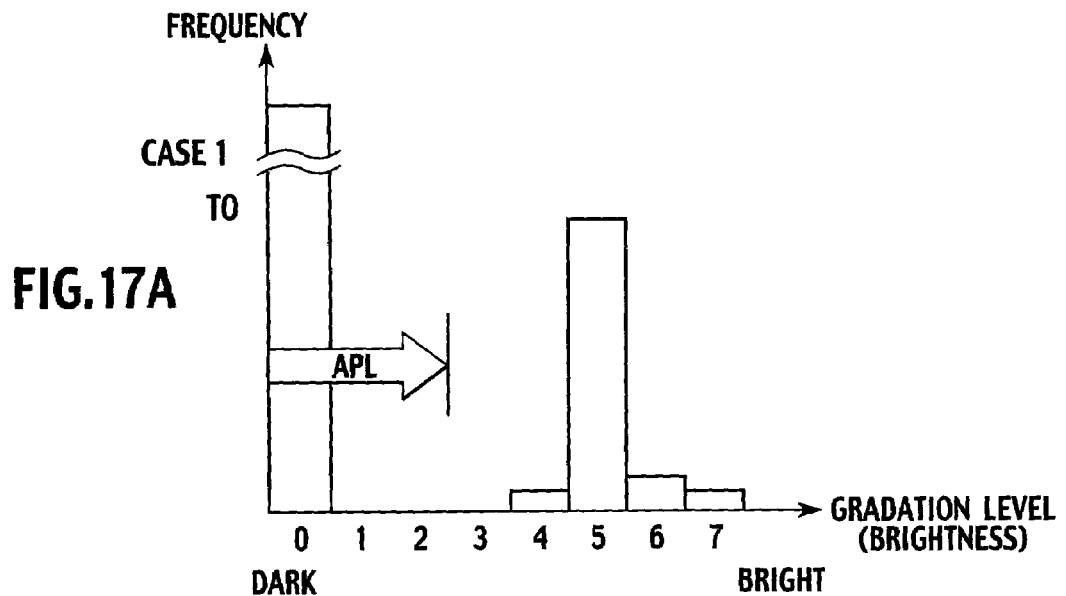
FIGS. 17A and 17B each show a distribution of gradation-level frequencies and an average picture level (APL) at time T0 of FIG. 14.
Figure 17B:
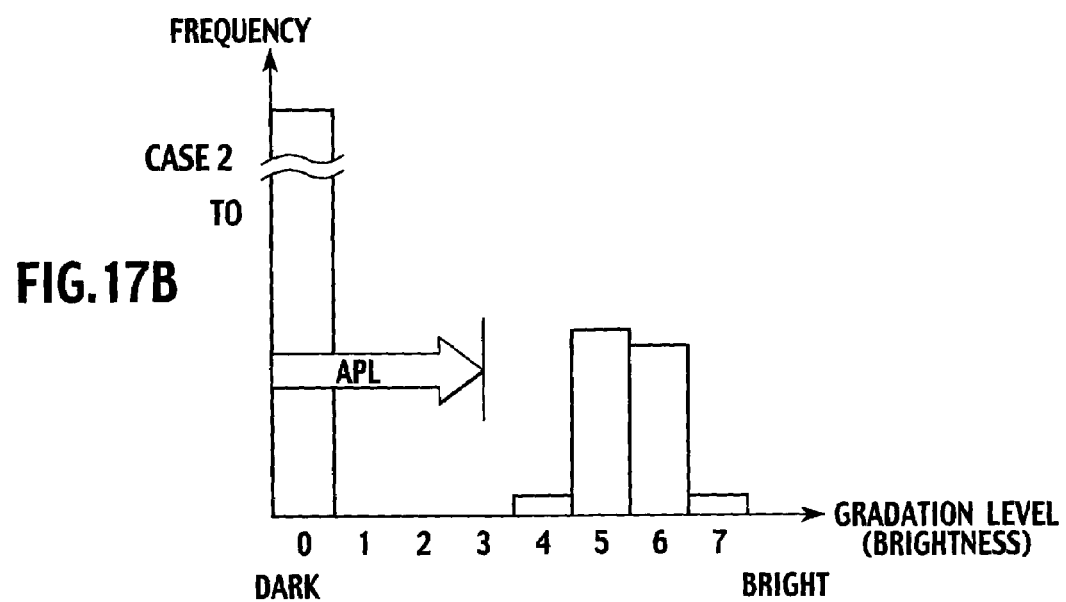

In FIGS. 17A and 17B at time T0, the user holds a hand against a target push button. In the case 1, the frequency of the gradation level group 5 is high. In the case 2, the frequencies of the gradation level groups 5 and 6 are relatively high. In the case 2, there are two high frequency gradation level groups, and therefore, each magnitude thereof is lower than that of the case 1. However, the sum of the frequencies of the gradation level groups 5 and 6 of the case 2 is substantially equal to the frequency of the group 5 of the case 1. The APL increases in proportion to an area occupied by the hand.

Figure 18A:
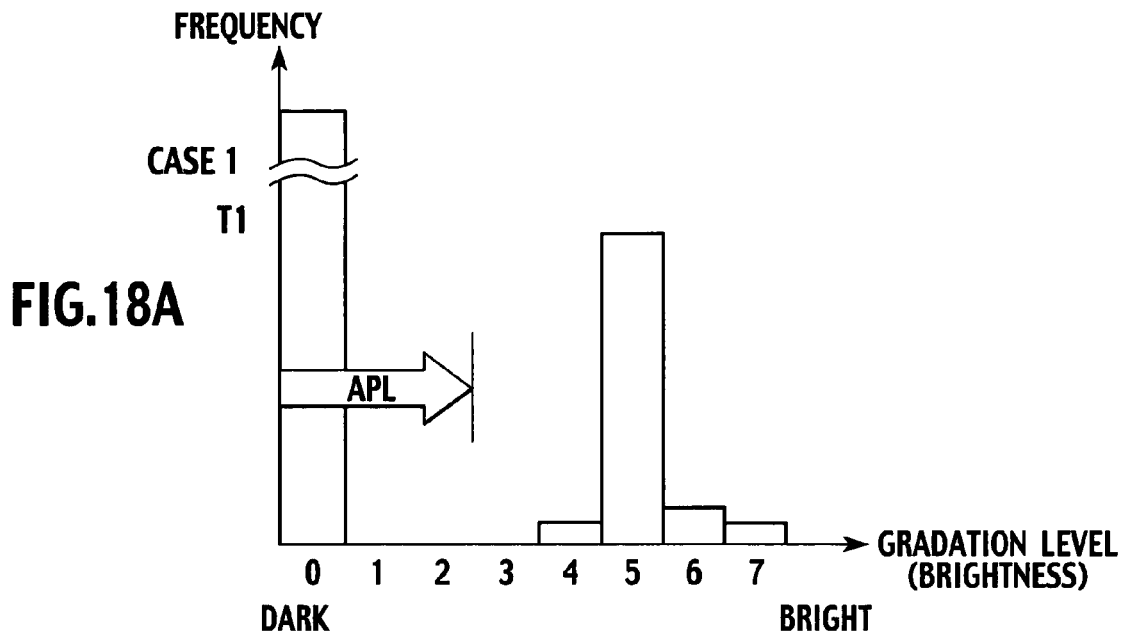
FIGS. 18A and 18B each show a distribution of gradation-level frequencies and an average picture level (APL) at time T1 of FIG. 14.
Figure 18B:
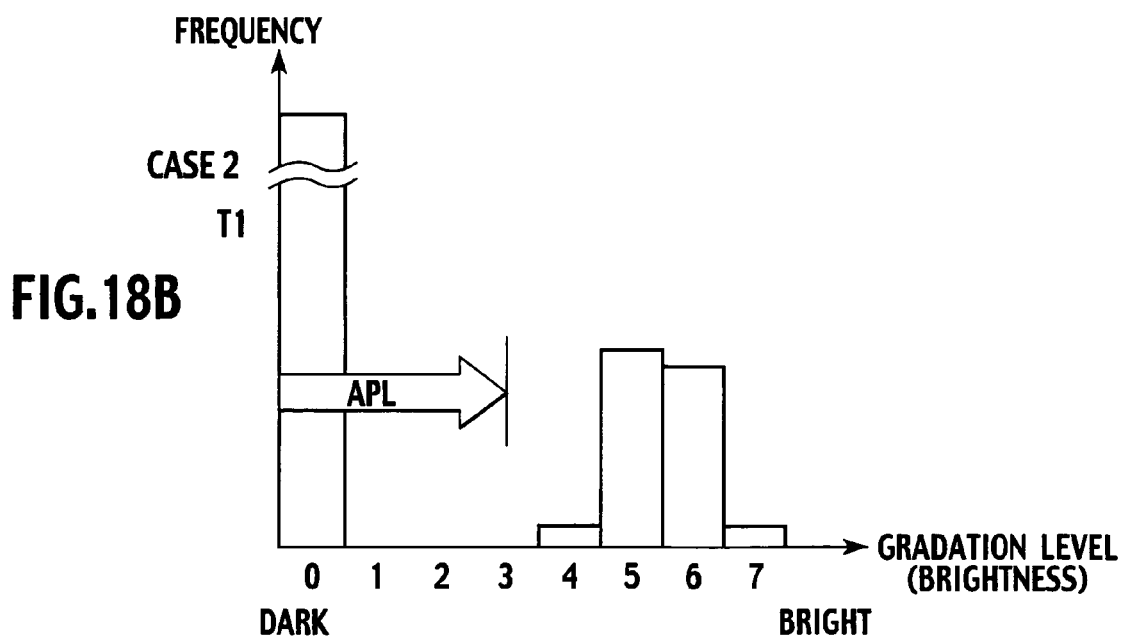

In FIGS. 18A and 18B at time T1, the user keeps the hand in the same state for the period Tm. The frequencies of the gradation level groups at this time are the same as those at time T0.

Figure 19A:
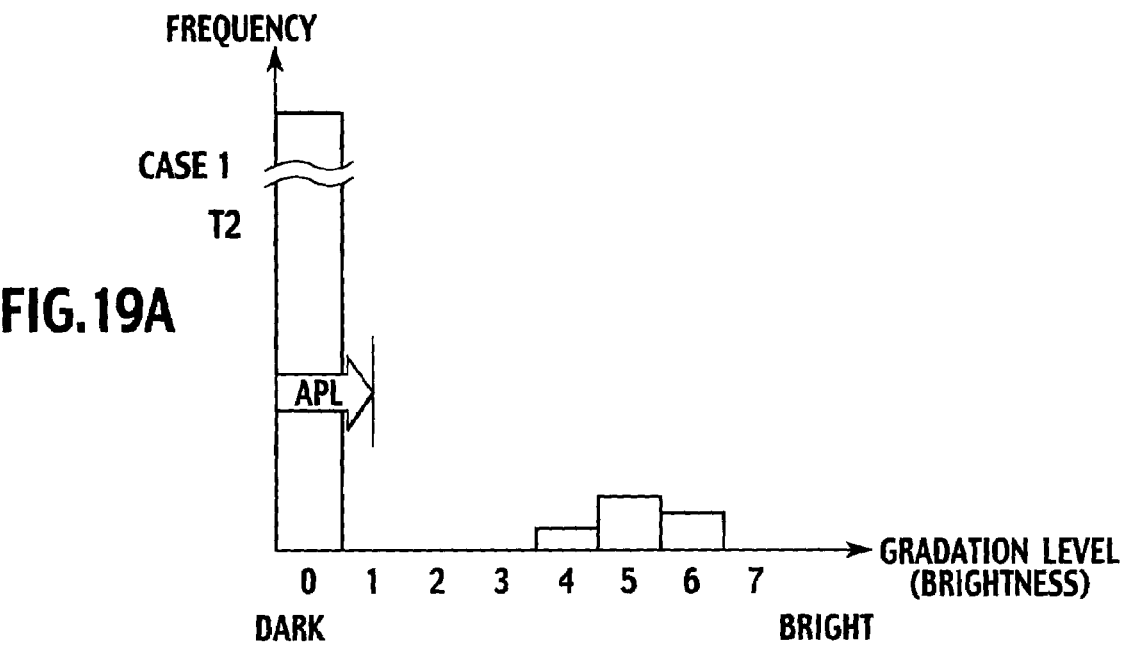
FIGS. 19A and 19B each show a distribution of gradation-level frequencies and an average picture level (APL) at time T2 of FIG. 14.
Figure 19B:
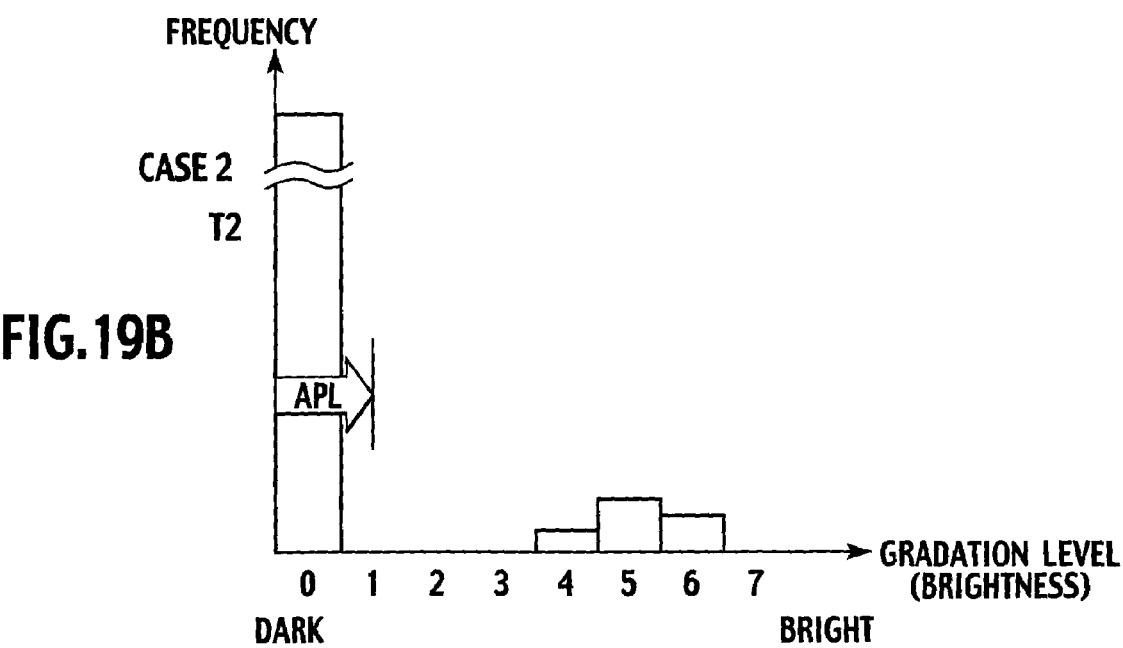

In FIGS. 19A and 19B at time T2, the user bends the fingers of the hand. A black area expands to reduce the frequency of the gradation level group 5. The APL decreases.

Figure 20A:
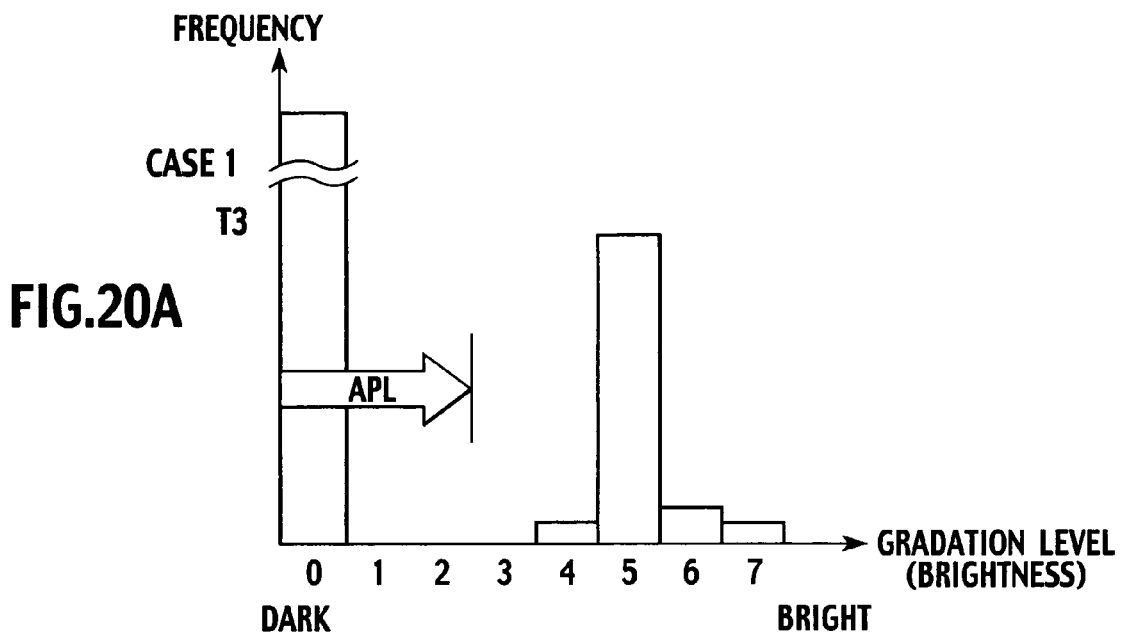
FIGS. 20A and 20B each show a distribution of gradation-level frequencies and an average picture level (APL) at time T3 of FIG. 14.
Figure 20B:
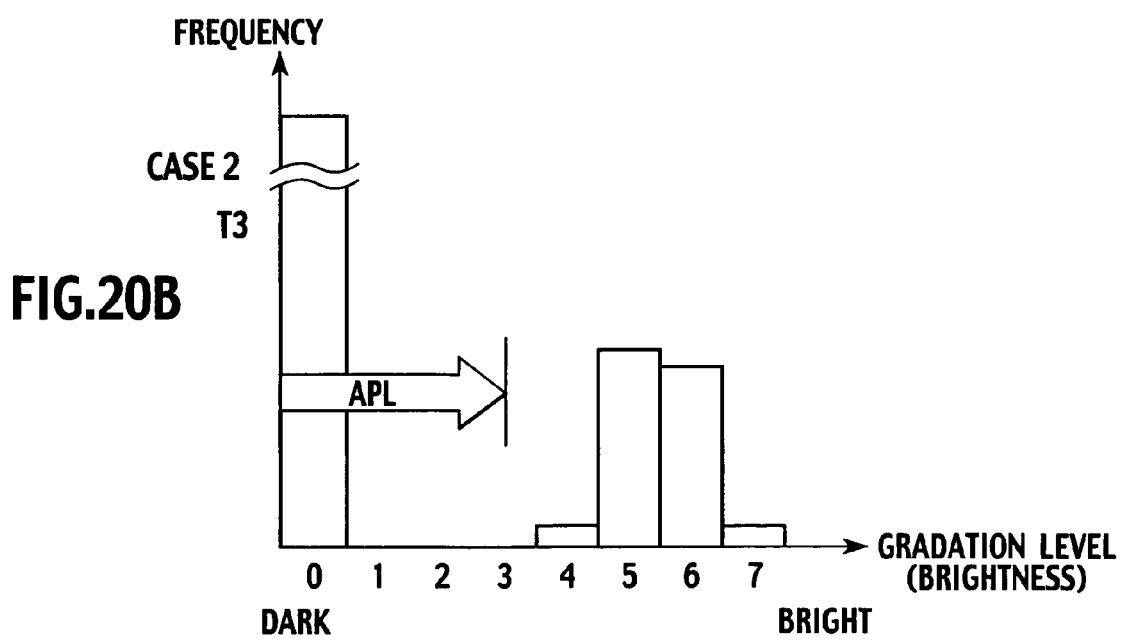

In FIGS. 20A and 20B at time T3, the user extends the bent fingers. The frequencies of the gradation level groups at this time are the same as those at time T0.

In FIGS. 21A and 21B at time T4, the user again bends the fingers. The frequencies of the gradation level groups at this time are the same as those at time T2.

Figure 22A:
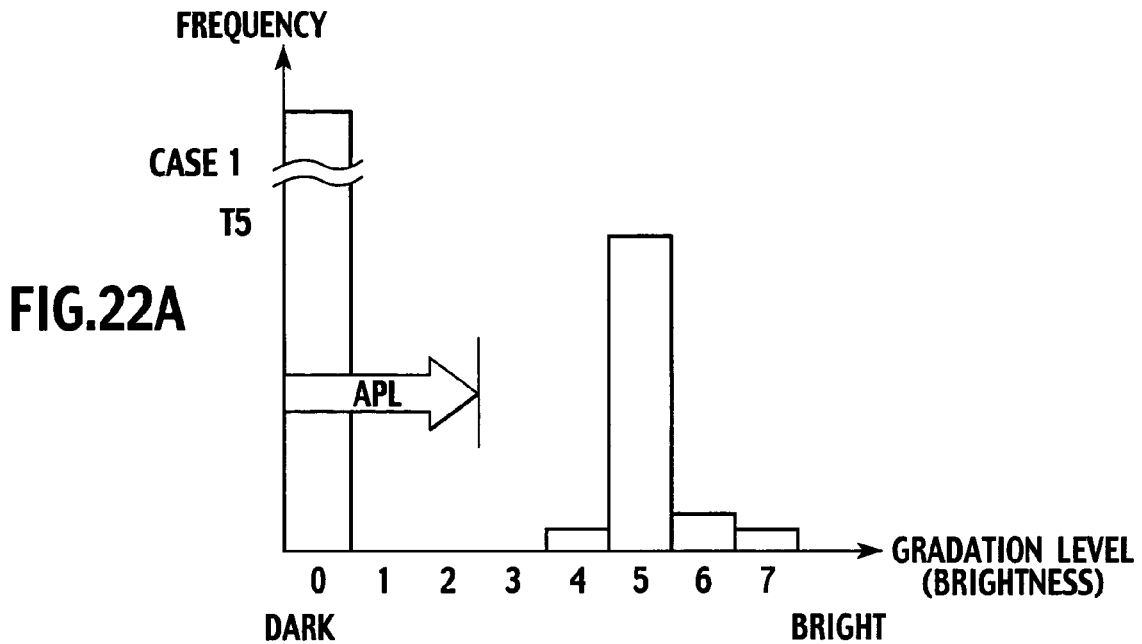
FIGS. 22A and 22B each show a distribution of gradation-level frequencies and an average picture level (APL) at time T5 of FIG. 14.
Figure 22B:
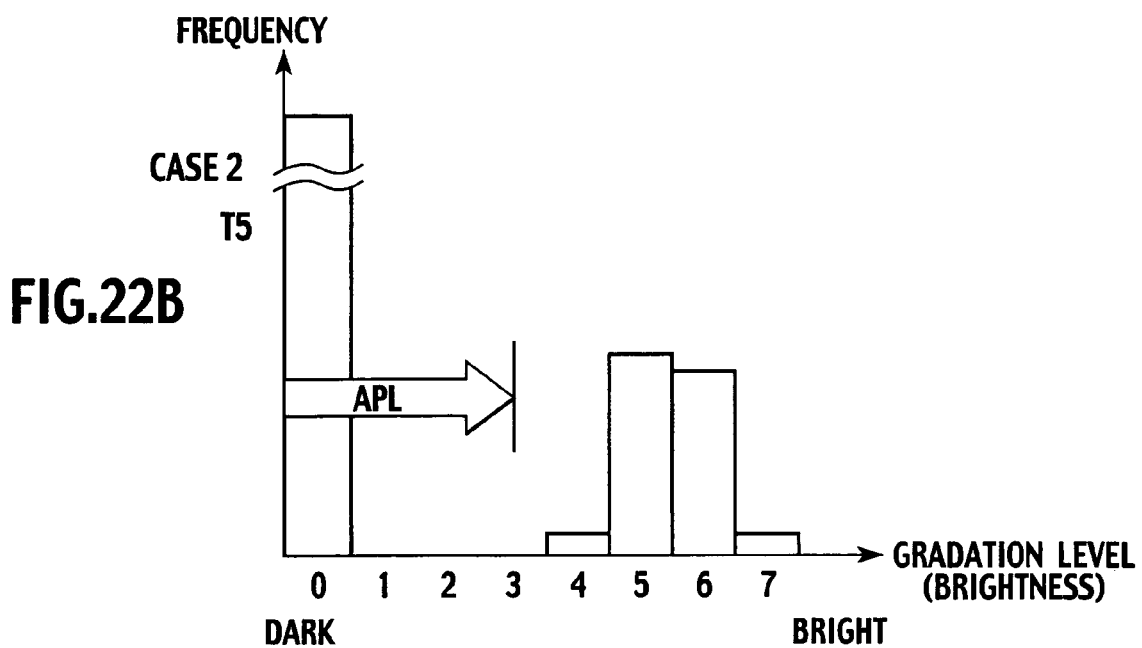

In FIGS. 22A and 22B at time T5, the user again extends the bent fingers. The frequencies of the gradation level groups at this time are the same as those at time T0.

Figure 23A:
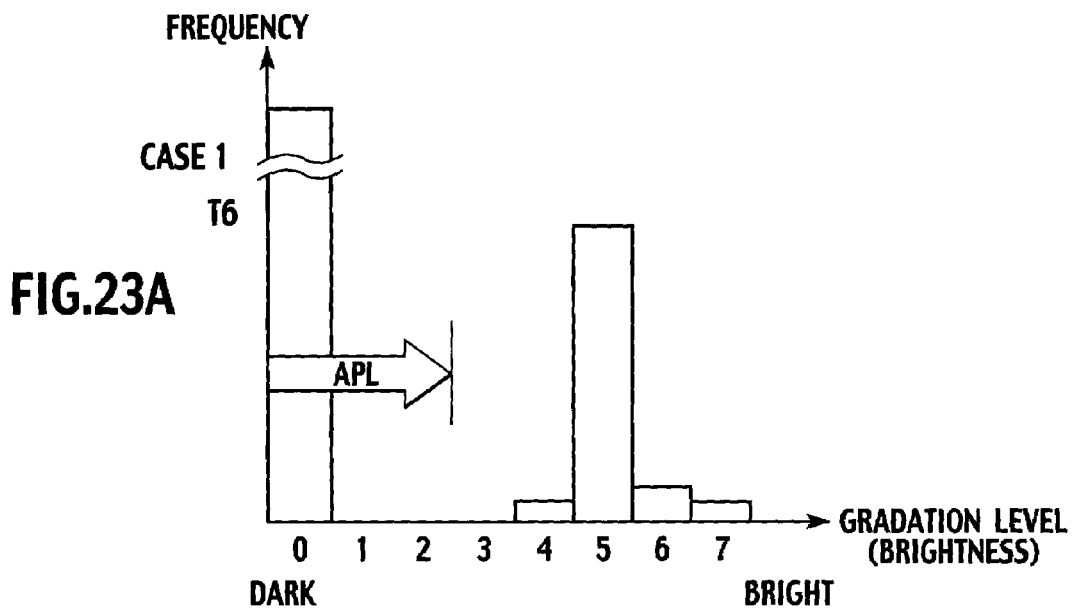
FIGS. 23A and 23B each show a distribution of gradation-level frequencies and an average picture level (APL) at time T6 of FIG. 14.
Figure 23B:
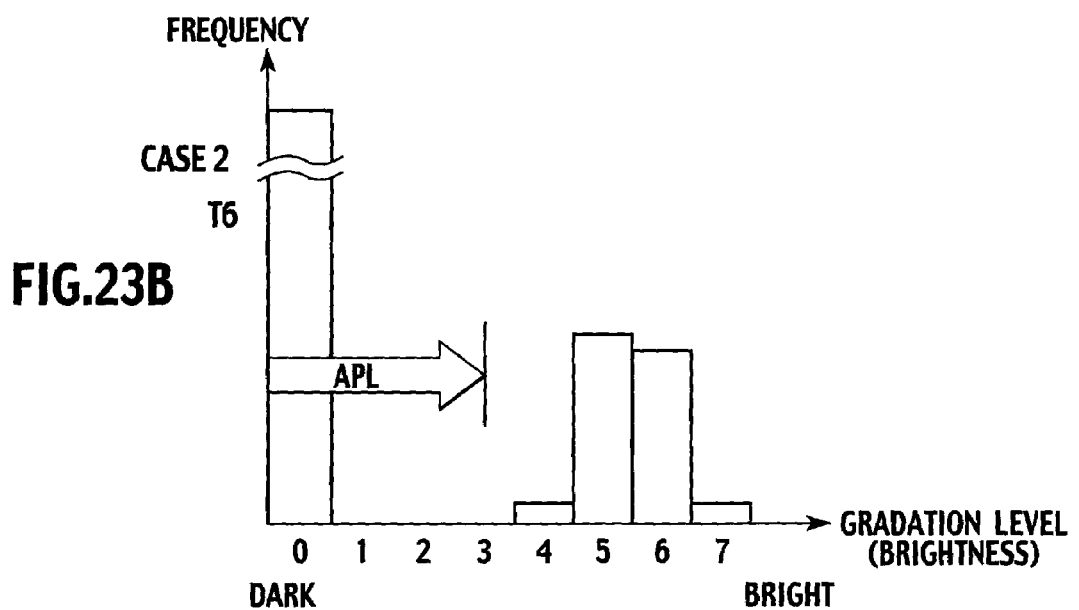

In FIGS. 23A and 23B at time T6, the user keeps the hand in the same state for the period Tm. The frequencies of the gradation level groups at this time are the same as those at time T0.

This embodiment colors every part excluding an extracted object black. The gradation level group 1 corresponds to black and is excluded from an evaluation object when processing the histogram data mentioned above. There are many ways to evaluate the histogram data. According to this embodiment, information directly related to the hand is in the gradation level groups 4, 5, 6, and 7 because the embodiment has limited the gradation levels of an objective image to those groups. The embodiment adds up the frequencies of the gradation level groups 4, 5, 6, and 7 and evaluates the sum.

Changes in the histogram sum are similar to changes in the APL values and are analyzed to determine motions of the hand. To increase the reliability of the determination of hand motions, different detectors may be employed. Detected data from the high-frequency detector 63, minimum value detector 64, maximum value detector 65, and the like are evaluated to accurately determine hand motions. According to this embodiment, data from the high-frequency detector 63 is used to detect the frequency of edge components between the hand and the black background. As is apparent from FIGS. 15A and 15B, edge components decrease when the user bends the fingers. Changes in the edge components are similar to changes in the histogram data and changes in the APL values. Data from the maximum value detector 65 shows little change if the fingers are partly within the push button area. In this case, this data is not useful to increase the detection accuracy of hand motions. According to this embodiment, the background of a hand to be detected is colored black, and therefore, data from the minimum value detector 64 shows no change and is useless to detect hand motions. Depending on the color and gradation levels of an object to be photographed by the video camera 2, the background of the object may be colored white to obtain a better detection result. Coloring the background of an object white or any other color that increases contrast may increase the accuracy of detection of the object.

Figure 24:
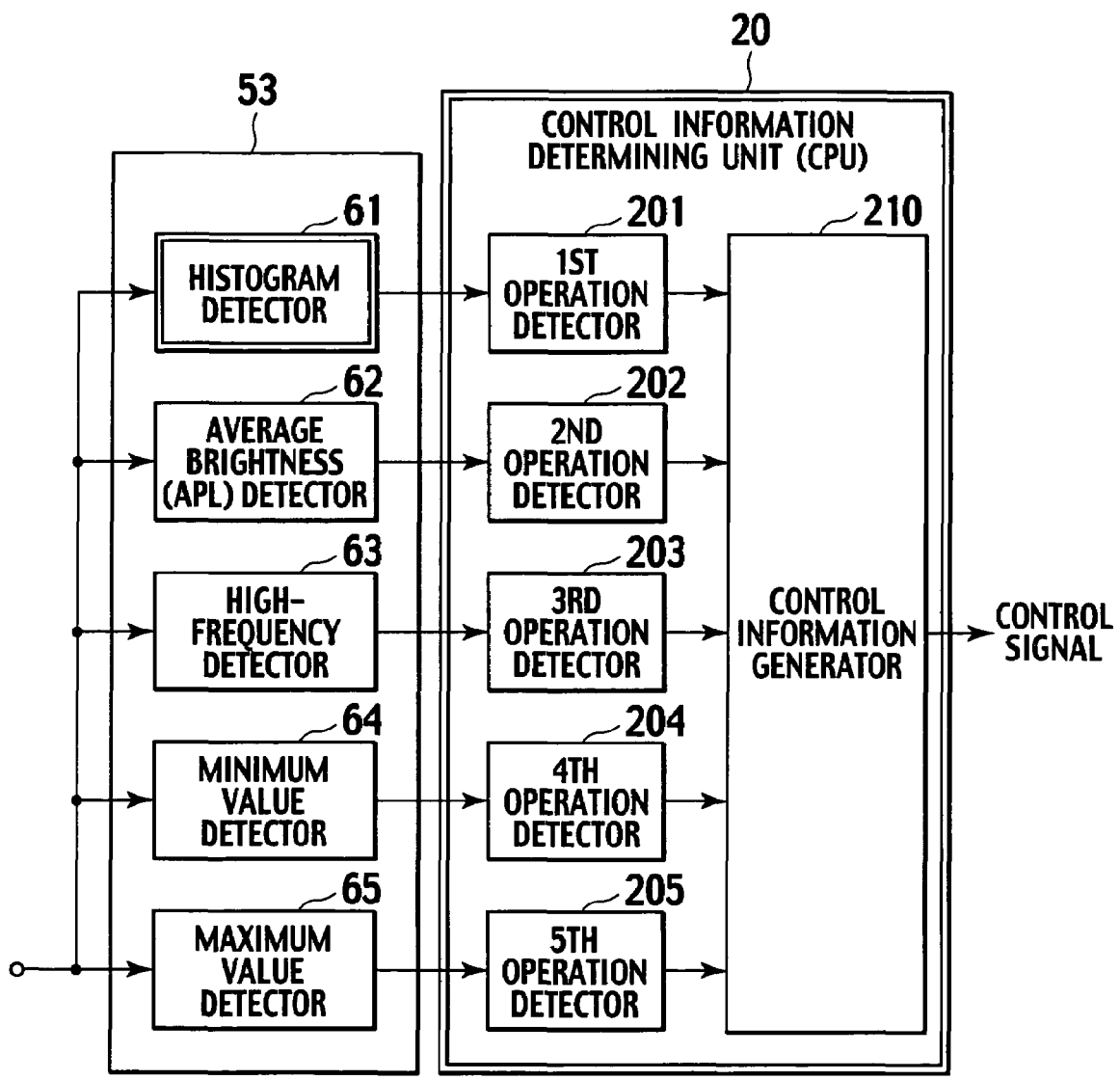
FIG. 24 is a functional block diagram showing a control information determining unit (CPU) of FIG. 2.

Evaluating the detected data is to identify predetermined hand motions. Algorithms used to identify various hand motions are basically the same and employ different scales depending on objects to detect. The output of the object characteristics detector 53 is transferred through the CPU bus to the CPU 20. The CPU 20 detects a hand operation and outputs proper control signals. FIG. 24 is a block diagram showing operational blocks of the CPU 20. The CPU 20 includes a first operation detector 201 corresponding to the histogram detector 61, a second operation detector 202 corresponding to the APL detector 62, a third operation detector 203 corresponding to the high-frequency detector 63, a fourth operation detector 204 corresponding to the minimum value detector 64, a fifth operation detector 205 corresponding to the maximum value detector 65, and a control information generator 210. The functions of these operation detectors 201 to 205 and control information generator 210 are realized by software.

The operation detectors 201 to 205 provide detection flags according to detection results from the corresponding detectors 61 to 65 and supply the detection flags to the control information generator 210. The control information generator 210 evaluates the detection flags and provides proper control information signals. The evaluation is carried out with the use of computer language operators such as a logical sum, logical product, exclusive logical sum, >, <, and the like. If an operational expression containing these operators is satisfied, a control signal is provided. According to this embodiment, a logical sum of the outputs of the operation detectors 201 to 205 is evaluated. Namely, when at least one operation detector provides a detection flag, this embodiment provides a control information signal.

Figure 25:
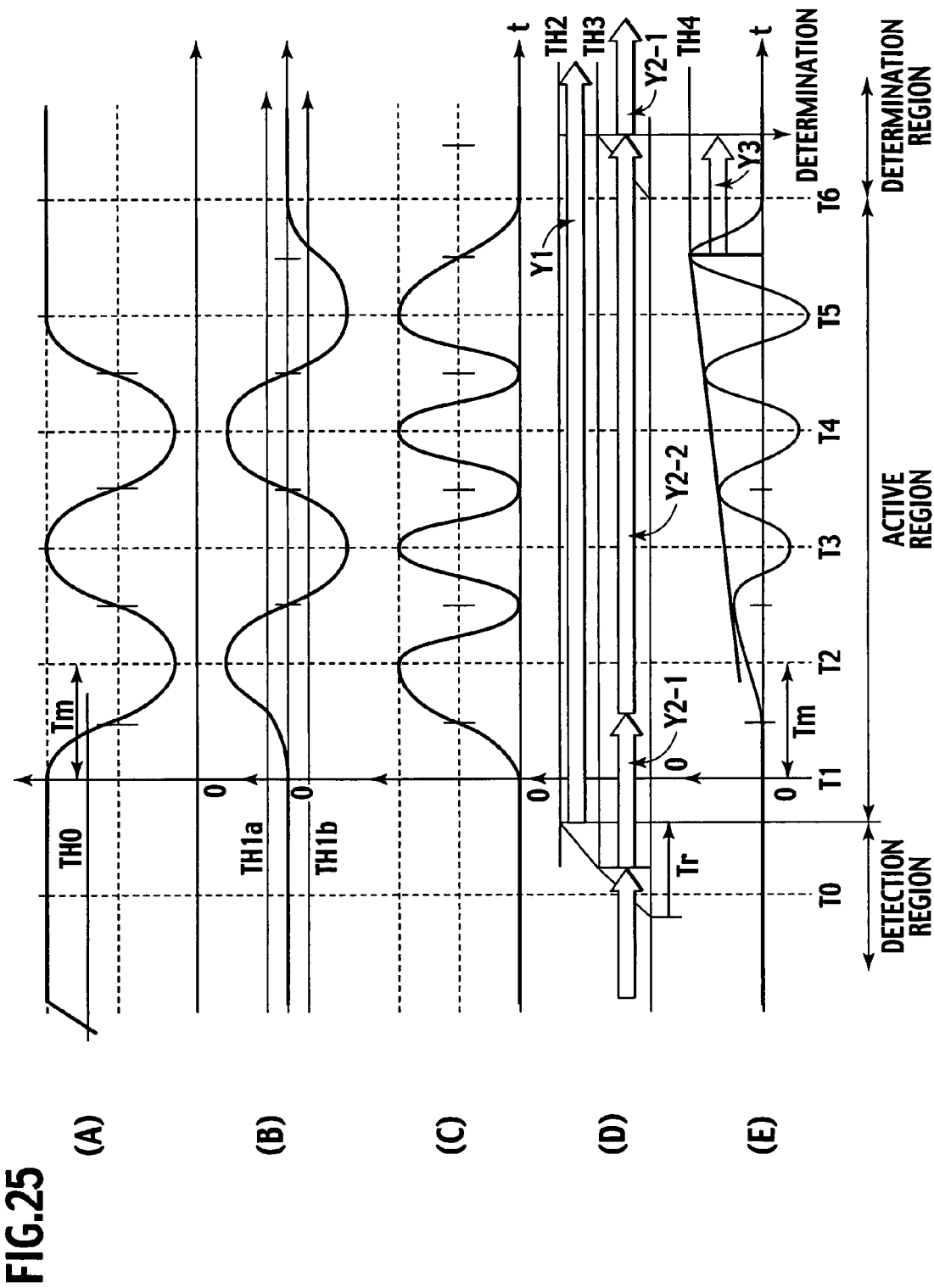
FIG. 25 is a time chart showing a process of determining a selected operation button.

The details of the operation detectors 201 to 205 will be explained. A sum of the limited gradation level groups of each histogram is used to detect a hand operation. FIG. 25 shows data changes obtained from the histograms. Time points T0 to T6 of FIG. 25 correspond to the time points T0 to T6 of FIG. 14, respectively. A waveform (A) of FIG. 25 shows changes in the sum of gradation level groups 4 to 6 of the histograms. The gradation level groups 4 to 6 represent the area of the hand excluding the black background. A waveform (B) of FIG. 25 shows a result after removing offset components from the waveform (A). In this case, the sum becomes zero if there is no change during the period Tm. A waveform (C) of FIG. 25 is obtained by squaring the waveform (B). A finger bending motion approximates a sinusoidal wave, and the squaring of the waveform (B) results in halving the period of the sinusoidal wave. A diagram (D) of FIG. 25 is obtained by integrating the waveform (A). In the diagram (D), an arrow represents a gate pulse to identify a hand motion. A diagram (E) of FIG. 25 is obtained by digital-filtering the waveform (C). This is to find a cross-correlation with respect to a hand motion. The diagrams (D) and (E) show a final process of determining if the user has manipulated a push button.

The waveforms or diagrams (A) to (E) of FIG. 25 will be explained in detail.

The waveform (A) of FIG. 25 is the same as that of FIG. 14 showing hand motions. Portions that are irrelevant to the determination of hand motions are omitted from the waveform (A). The period Tm is a period between a finger extended state and a finger bent state and serves as a hand operation reference period (interval). A period from time T0 to T1 is a hand holding period in which the user holds his or her hand over a push button for about the period Tm to activate the push button. In a period from T1 to T2, the user bends the fingers of the hand. In a period from T2 to T3, the user extends the fingers. In a period from T3 to T4, the user again bends the fingers. In a period from T4 to T5, the user again extends the fingers. In a period from T5 to T6, the user keeps the finger extended state for the period Tm. A series of these motions resemble a mouse double clicking operation, and one may easily carry out these motions.

Figure 26:
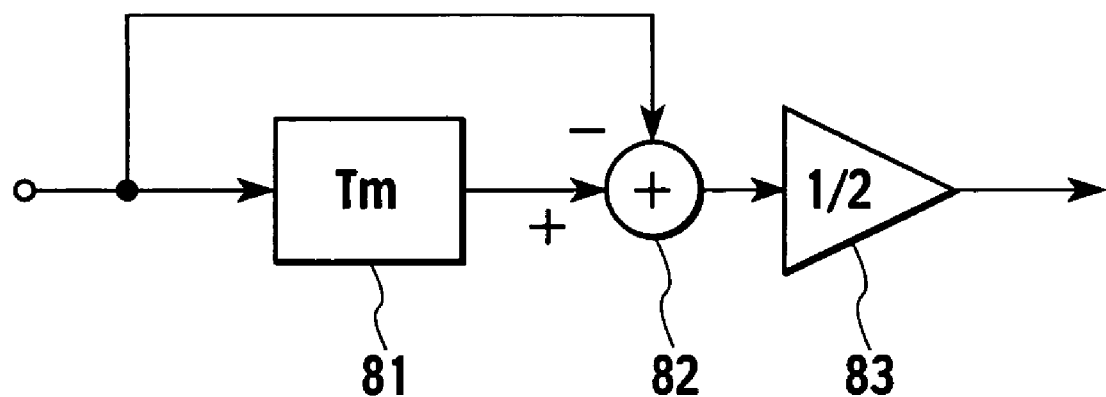
FIG. 26 is a block diagram showing a digital filter for removing DC offset components.

The waveform (B) of FIG. 25 is obtained by removing DC offset components from the waveform (A) with the use of a filter. FIG. 26 shows an example of the filter for removing DC offset components. The filter consists of a delay unit 81 for delaying an input signal by the period Tm, a subtracter 82 for subtracting an input signal from an output signal of the delay unit 81, and an attenuator 83 for attenuating a signal level by ½. This filter is a high-pass digital filter having tap coefficients of (−½, ½) around the period Tm. The delay by the period Tm is to pass a waveform related to a hand motion. The configuration of the digital filter is not limited to this example. The configuration of FIG. 26 is simple and involves a small absolute delay. If the signs of the tap coefficients are changed as (½, −½), an output waveform will be inverted. The sign inversion, however, has no influence on processes that follow and provides the same effect as that without sign inversion.

Figure 27:
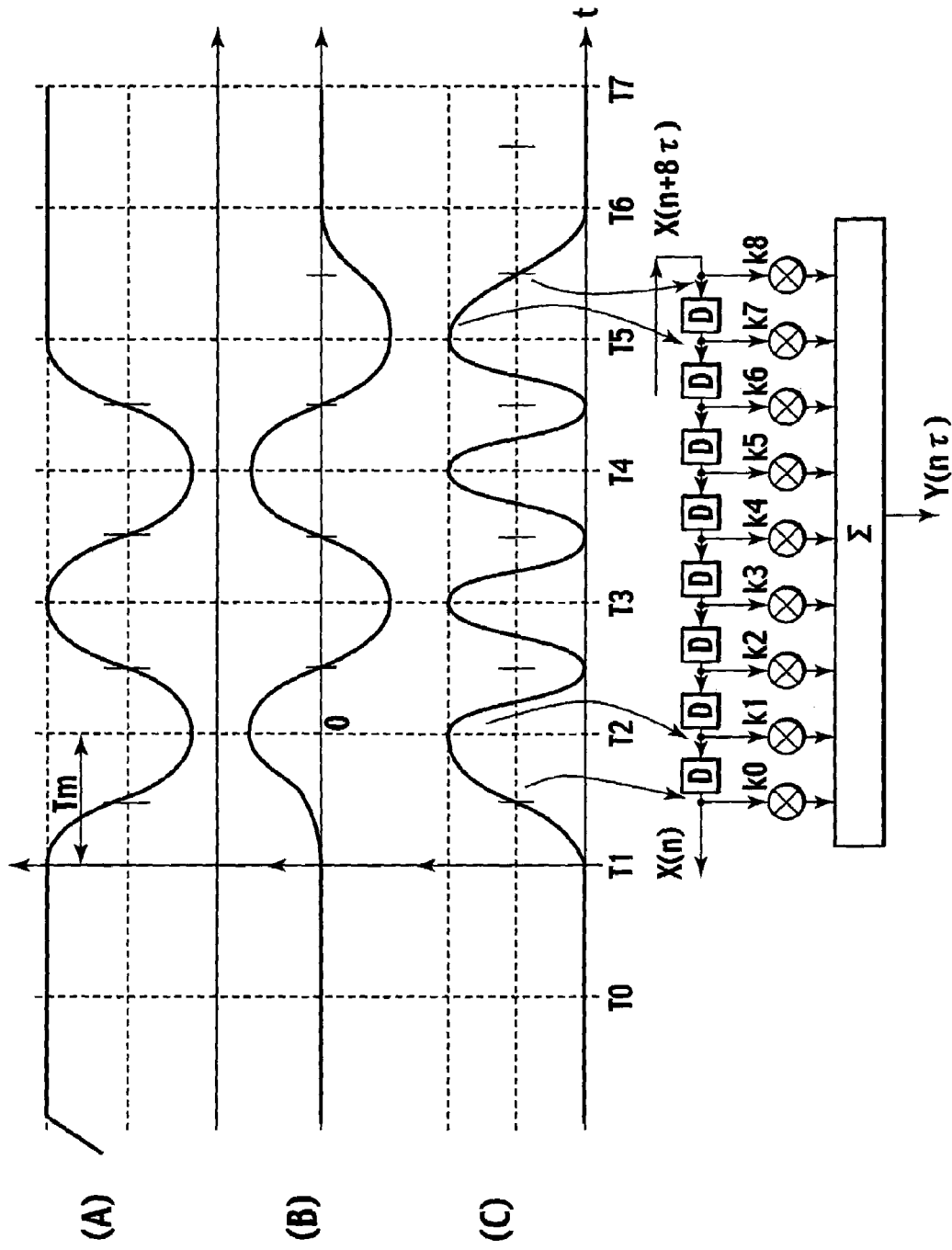
FIG. 27 shows a relationship between digital filters (one of which is shown in FIG. 26) and processed waveforms.

The waveform (C) of FIG. 25 is obtained by squaring the waveform (B). If the waveform (B) is sinusoidal, the waveform (C) is also sinusoidal with a period of ½. Conducting a correlation operation on the waveform (C) with digital filters provides the diagram (E) of FIG. 25. The details of this are shown in FIG. 27. Waveforms (A) to (C) of FIG. 27 correspond to the waveforms (A) to (C) of FIG. 25. A lower part of FIG. 27 shows cross-correlation digital filters. A square mark with "D" in the lower part of FIG. 27 represents a delay of one vertical period and corresponds to a D-flip-flop (hereinafter referred to as DFF) used in the digital filter. Marks k0, k1, . . . , k8 are tap coefficients of the digital filters. A mark Σ is a summation of the tap coefficients to provide a cross-correlation value Y(nt). A waveform to check for a hand operation is obtained from the waveform (C) of FIG. 27. Between this waveform and a waveform of the tap coefficients are cross-correlated, and if the waveforms completely or approximately agree with each other, the output of the cross-correlation digital filters reaches a maximum value.

The operation conducted by the digital filters of FIG. 27 is expressed as follows (N is 9 in the example of FIG. 27):

$$Y(n\tau) = \sum_{i=0}^{N-1} x(n + i\tau)k(i\tau)$$

The digital filters shown in FIG. 27 receive the waveform (C) of FIG. 27 from the right side thereof. The reason why the signal is input from the right side thereof is to temporally adjusting the waveform supplied to the DFFs as indicated with arrows. Accordingly, a last hand motion is supplied to the rightmost DFF involving no delay. Cross-correlation coefficients are obtained from the waveform (C) of FIG. 27. Scaling will not be explained here. The coefficient values must not be biased by DC offsets. Accordingly, DC offsets are removed with the center level of the waveform (C) of FIG. 27 serving as a reference. The coefficient values are used to calculate a correlation with respect to a hand operation. A different hand operation needs different coefficient values. Accordingly, changing the coefficient values results in changing a hand operation to control the electronic appliance. It is possible to hold several correlation values and run a plurality of digital filters, to recognize different hand operations. The example of FIG. 27 employs nine tap coefficients to take nine vertical periods. If a video signal has 60 vertical periods per second, the nine taps take about ⅐ seconds. This requires a hand motion of relatively high speed. If a slower hand motion is needed, the number of tap coefficients must be increased. In this way, the speed of a hand motion to recognize is adjustable by adjusting the number of tap coefficients. In practice, an optimum number of tap coefficients is determined through tests.

In this example, the waveform (C) of FIG. 27 is used for providing correlation coefficient values. Instead, the waveform (B) of FIG. 27 between time T1 and T6 may be employed. The waveform (C) of FIG. 27 is more accurate.

Figure 28:
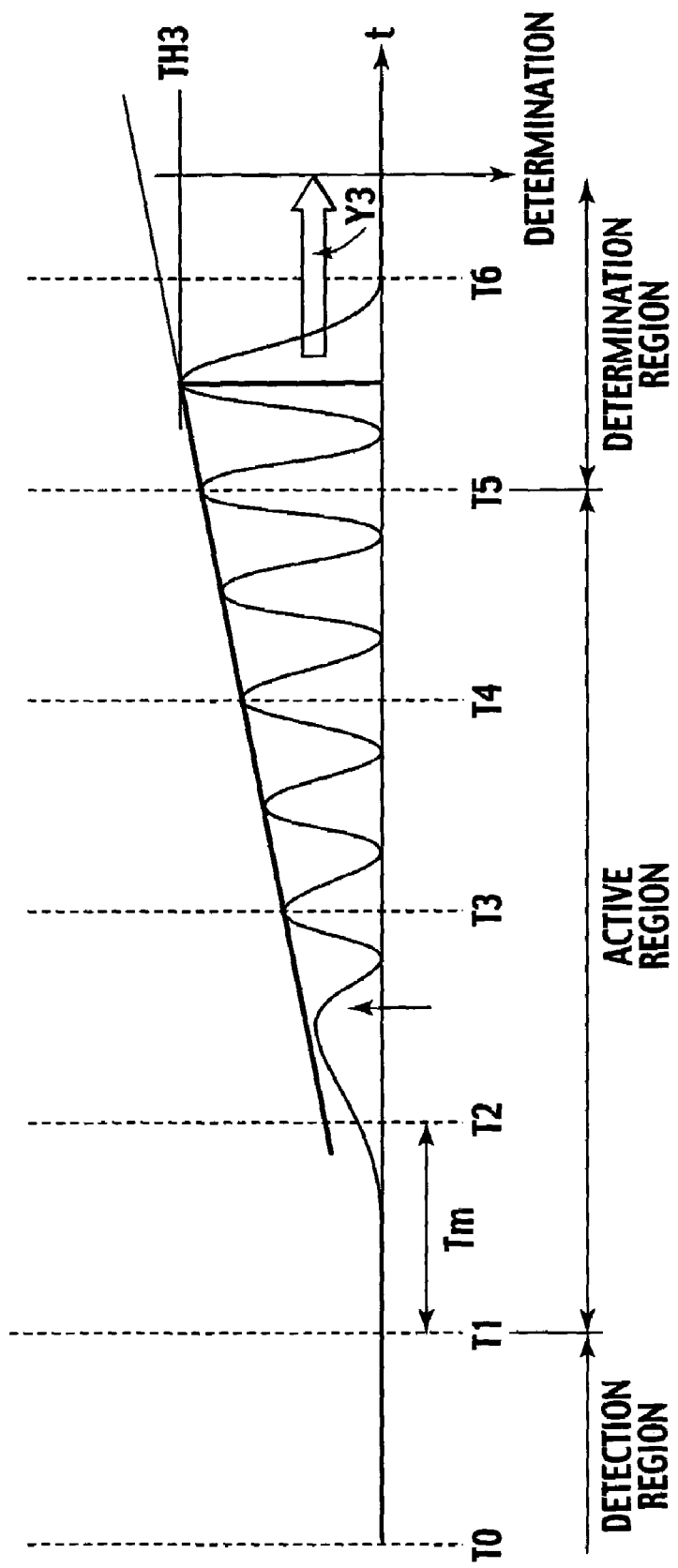
FIG. 28 is a time chart showing changes in cross-correlation between an operation to be detected and a predetermined selecting operation.

Returning to FIG. 25, the diagram (E) will be explained. The diagram (E) is obtained by passing the waveform (C) of FIG. 25 through the cross-correlation digital filters and by modeling the output of the digital filters. As time passes, the degree of matching between a hand motion and the tap coefficients increases to increase a peak value. To evaluate the waveform shown in the diagram (E) of FIG. 25, the waveform is changed into absolute values (the absolute value of a negative value is indicated with an arrow), and the absolute values are integrated as indicated with an envelope in the diagram (E). When the envelope exceeds a threshold value TH4, a hand operation to control the electronic appliance is confirmed. When obtaining the absolute values, the waveform maybe squared and integrated as shown in FIG. 28. This provides the same result.

The magnitude of the waveform (C) of FIG. 25 is dependent on initial histogram data and affects the accuracy of the hand motion determination. To start integration or accumulation, initialization (reset) is needed. This is shown in the diagram (D) of FIG. 25. To further increase detecting accuracy, meaningless information must be suppressed.

The diagram (D) of FIG. 25 is obtained by integrating the histogram data (A) of FIG. 25 along a time axis. A period up to time T1 is a period in which the user holds his or her hand against the display 23. The waveform (B) of FIG. 25 becomes zero when no change is observed in the waveform (A). When the user holds his or her hand, it is a still state although it involves some movement because it is a human motion. Such minor movements in a still state may be cut off by setting an insensitive band. When the waveform (B) is between threshold values TH1a and TH1b and when the waveform (A) is above a threshold value TH0, values are integrated to provide the diagram (D). Initialization is carried out when the waveform (A) is below the threshold value TH0. When the integrated value in the diagram (D) exceeds the threshold value TH2, the hand motion determining operation is activated. The period between the initialization and the point at which the threshold value TH2 is exceeded is a detection region.

After the integrated value of the diagram (D) of FIG. 25 exceeds the threshold value TH2, a period having a specific time constant is set as indicated with an arrow Y1. This is an active region that continues from the end of the detection region up to the start of a determination region. The active region conducts correlation calculations. The determination region refers to a result of the correlation calculations and determines if there is a hand operation that controls the electronic appliance. The determination region starts when an integration of the absolute values of outputs of the cross-correlation digital filters exceeds the threshold value TH4. The diagram (D) of FIG. 25 has another threshold value TH3 that is smaller than the threshold value TH2. A period that exceeds the threshold value TH3 and is indicated with an arrow Y2-1 is used for determining a hand motion. The finger bending motion mentioned above ends when the user extends the fingers. The threshold value TH3 is used to confirm the last finger extending motion. A period indicated with an arrow Y2-2 before the period Y2-1 is considered to be a determination prohibited period to avoid an erroneous recognition. When the arrows Y1, Y2-1, and Y3 are established, a hand operation to be used as control information is confirmed in the determination region.

The detection region is a region to recognize that a hand is held against the display. After finishing this region, the color and shape of a graphics control image may be changed to actively guide the user. After the end of the active region or the determination region, the color and shape of the graphics control image may be changed to inform the user of the same. This is advantageous for the user not to repeat the same operation.

The absolute value of the threshold value TH3 will be explained. The magnitude of an output value from the cross-correlation digital filters is dependent on an area occupied by a hand. The area may be fixed so that the user may adjust the position of his or her hand relative to the area. It is necessary, however, to absorb fuzziness specific to the user. This embodiment examines a period Tr to reach the threshold value TH2 and adjusts the threshold values TH3 and TH4 accordingly. The period Tr becomes shorter as the area occupied by a hand increases and becomes longer as the hand-occupied area becomes smaller. Accordingly, if the period Tr is long, the threshold values TH3 and TH4 are increased, and if the period Tr is small, the threshold values TH3 and TH4 are decreased. This adaptive control suppresses dependence on the area occupied by a hand and correctly recognizes hand motions.

When carrying out the hand motion detecting operation according to this embodiment, the size of a hand of the user may be too small relative to the view angle of the video camera 2, or the hand of the user may not reach the push buttons displayed on the display 23. In this case, the scaler 15 of FIG. 2 conducts enlargement, contraction, or phase (position) adjustment, to properly display the user's image on the display. FIG. 29 explains such operation. In an image (A) of FIG. 29, a user's image is too small to control the push buttons displayed on the display. In this case, the scaler 15 is controlled to enlarge the user's image and adjust a phase so that the user's image is positioned at the center of the display. As a result, the user's image is displayed at a proper size and proper position as shown in an image (B) of FIG. 29.

Figure 30:
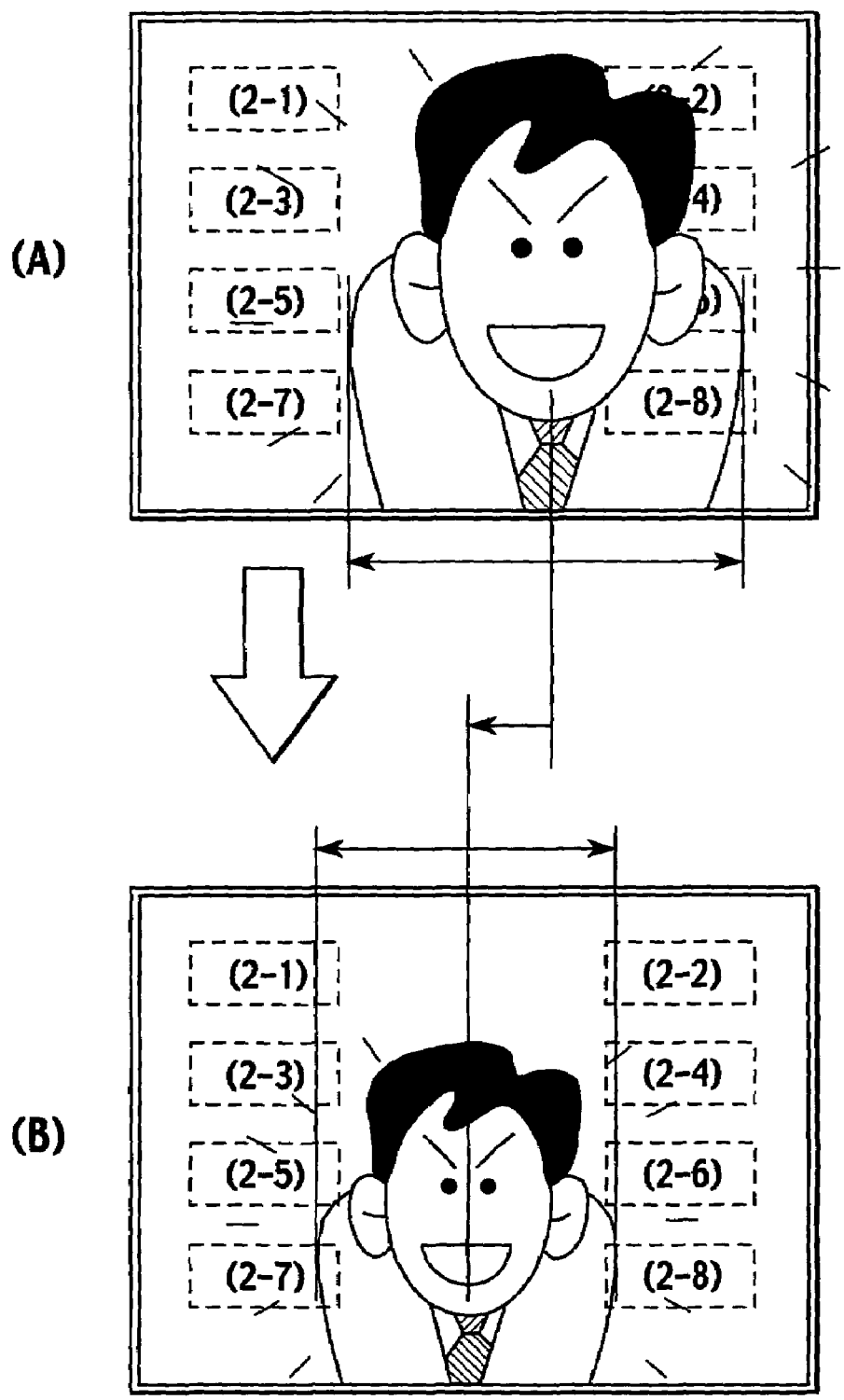
FIG. 30 shows an operation carried out when the image of an operator photographed by video camera is too large.

FIG. 30 shows another example of a display adjustment. The scaler 15 is controlled to contract a user's image and adjust a phase to bring the user's image at the center of the display.

Figure 31:
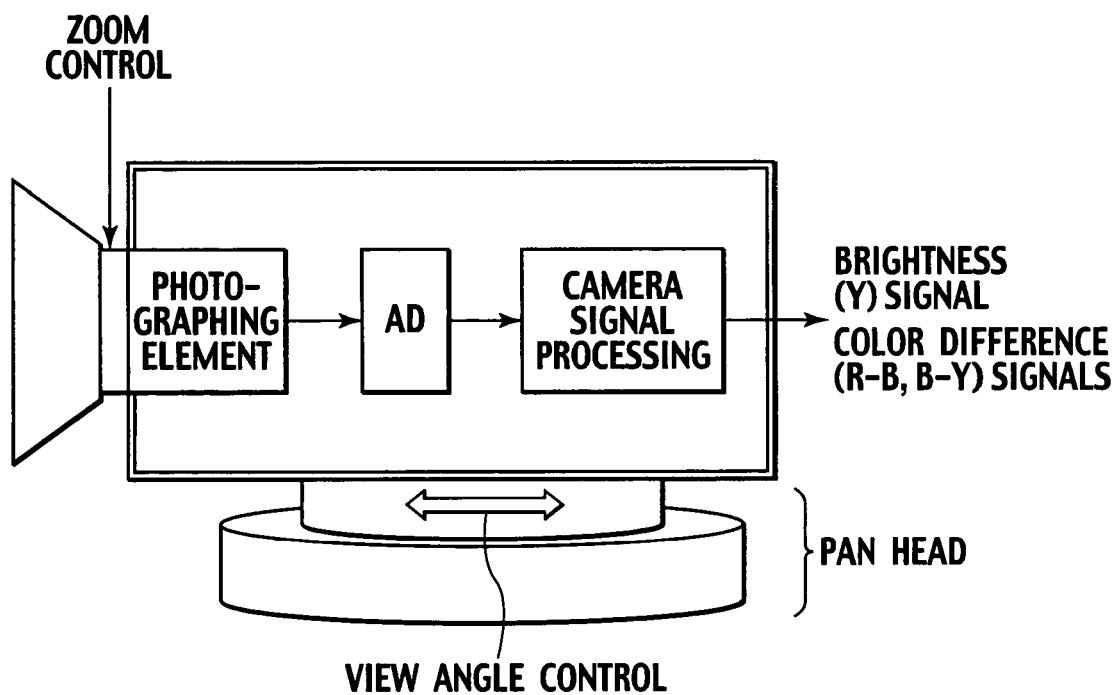
FIG. 31 shows a video camera and an apparatus for changing the angle of view of the video camera.

FIG. 31 shows another technique of adjusting a user'image displayed on the display 23. A video camera 2 is installed on a pan head. The pan head is controlled to control an angle of view, and the video camera 2 is controlled to control a zoom level, so that a user's image is displayed on the display 23 at a proper size and proper position.

This embodiment displays a control image over a graphics image displayed on a display and overlays an image of the user over the graphics and control images, to allow the user to conduct an operation while seeing the user's image. The overlaid images are sometimes difficult to see. In this case, the mixing ratio of the first mixer 17 or second mixer 22 is controlled in response to timing pulses (horizontal and vertical) to identify the on-screen area of each detector shown in FIG. 6, so that the images become clear to see. For example, to make the push buttons in the control image clearly be seen, the timing pulses are controlled to reduce the control value a1. Meticulously controlling the mixers in such away results in clearly displaying the user's image and control image (push buttons).

The embodiment of the present invention mentioned above employs hardware and software. Components of the embodiment may be optionally divided into hardware and software.

According to this embodiment, a user employs his or her hand to touch push buttons of a graphics menu displayed on a display. The push buttons may substitute for any functions provided for a remote controller, such as "Power," "Channel," "Volume," Input switching," "Up," "Down," "Left," "Right," "OK," and other functions.

In this way, the present invention can control an electronic appliance without a controlling device such as a remote controller. The present invention can solve the problems related to a remote controller, such as battery run-down and contact defects. If there are a plurality of appliances to control with remote controllers, the user must find out a proper one of the remote controllers. The present invention can solve this problem because it employs a human body to control the appliances.

Since the present invention displays a control menu on a display, it can control a variety of devices. This ability is important for a networked environment. According to the present invention, a control menu for a remote appliance connected to a network can be transferred to an appliance that is connected to the network and has a display, to control the remote appliance at the appliance having the display. In this way, the present invention can control a control menu of any networked device.

To control a menu displayed on a display with a remote controller, a user must manipulate keys on the remote controller several times before selecting one button in the displayed menu. For this, the user must alternately see the display and remote controller. On the other hand, the present invention overlaps a user's image on a control menu on a display, and therefore, the user can always see the display when selecting the menu. Accordingly, the present invention allows the user to quickly accomplish a desired operation. This reduces the fatigue of the eyes of the user and improves the usability of electronic appliances.

A hand operation to be carried out according to the present invention can be made to imitate a mouse operation of a personal computer. For example, a finger bending operation according to the above-mentioned embodiment can substitute for a mouse double clicking operation. The personal computers are widely spread in these days, and therefore, operations like those carried out on the personal computers are easily accepted by many users and are preferable in terms of information literacy.

The present invention is not limited to the embodiment mentioned above and allows various modifications. For example, mixing ratios used by the first mixer 17 and second mixer 22 may be modified in various ways to realize a variety of combinations of video camera images, graphics menus, and broadcasting images. This results in simultaneously handling a variety of information pieces.

The present invention can handle not only television receivers but also any other electronic appliances having displays, such as personal computers, combinations of television receivers and video disk recorders, and combinations of television receivers and video tape recorders.

It should be understood that many modifications and adaptations of the invention will become apparent to those skilled in the art and it is intended to encompass such obvious modifications and changes in the scope of the claims appended hereto.

What is claimed is:

1. A controller for controlling an electronic appliance having a display, comprising:
  an image pickup unit configured to photograph an operator who is in front of the display;
  a mirror image converter configured to convert an image of the operator photographed by the image pickup unit into a mirror image and output a mirror image signal representative of the mirror image;
  an operational image generator configured to generate an operational image signal representative of an operational image that is displayed on the display and is used by the operator to make the electronic appliance perform a desired operation;
  a mixer configured to mix the mirror image signal with the operational image signal;
  a detector configured to detect that the operator displayed on the display has pointed to the operational image displayed on the display, the operator and operational image being displayed on the display according to the mixed signals from the mixer; and
  a controlling unit configured to detect whether or not the operator has carried out an operation with respect to the displayed operational image while the detector is indicating that the operator has pointed to the displayed operational image, and if detecting that the operator has carried out an operation with respect to the displayed operational image, control the electronic appliance according to an operation that is determined from a position of the operational image where the operator has pointed to,
  wherein the detector comprises:
    an extractor configured to extract an area from the mirror image, the area corresponding to a hand of the operator pointing to the displayed operational image; and
    a characteristics detector configured to detect data showing changes of an image signal of the hand corresponding area to the operational image signal,
      wherein the controlling unit generates a waveform based on the data detected by the characteristics detector and calculates a degree of matching between the waveform and a predetermined waveform, thereby determining whether or not the operator has carried out an operation with respect to the operational image.

2. The controller of claim 1, wherein the characteristics detector further comprises:
  a histogram detector configured to detect a histogram showing frequencies of occurrence of gradation levels in the image signal of the hand corresponding area,
  wherein the controlling unit generates the waveform based on temporal changes of the detected histogram from the histogram detector, thereby determining whether or not the operator has carried out an operation with respect to the operational image.

3. The controller of claim 1, wherein the extractor further comprises:
  a color filter configured to extract a specific-color area from the mirror image, the specific-color area corresponding to the hand of the operator Pointing to the displayed operational image.

4. The controller of claim 3, wherein the extractor further comprises:
  a gradation limiter configured to extract a range of predetermined gradation levels from the mirror image signal; and
  a synthesizer configured to output a synthesized signal of a signal indicating that the color filter has extracted an image signal of the specific-color area and a signal indicating that the gradation limiter has extracted an image signal of the range of the predetermined gradation levels.

5. The controller of claim 4, wherein the extractor further comprises a gate configured to replace an area excluding the hand corresponding area from the mirror image with a given brightness or color if the synthesizer do not output the synthesized signal.

6. The controller of claim 4, wherein the controlling unit further comprises:
  a scaler configured to scale the mirror image signal,
  wherein the controlling unit calculates a time when an integral value of the waveform with respect to time takes to reach a first threshold, thereby controlling the scaler based on the calculated time.

7. A method of controlling an electronic appliance having a display, comprising:

photographing an operator who is in front of the display with an image pickup unit;

converting an image of the operator photographed by the image pickup unit into a mirror image and outputting a mirror image signal representative of the mirror image;

generating an operational image signal representative of an operational image that is displayed on the display and is used by the operator to make the electronic appliance perform a desired operation;

mixing the mirror image signal with the operational image signal;

detecting that the operator displayed on the display has pointed to the operational image displayed on the display by extracting a specific-color area from the mirror image signal, the specific-color area corresponding to a hand of the operator pointing to the displayed operational image, the operator and operational image being displayed on the display according to the mixed signals;

detecting whether or not the operator has carried out an operation with respect to the displayed operational image while it is being detected that the operator has pointed to the displayed operational image; and controlling, if it is detected that the operator has carried out an operation with respect to the displayed operational image, the electronic appliance according to an operation that is determined from a position of the operational image where the operator has pointed to, wherein the first detecting step further comprises:

extracting, as an extracting step, an area from the mirror image, the area corresponding to a hand of the operator pointing to the displayed operational image; and detecting, as a change detecting step, data showing changes of an image signal of the hand corresponding area to the operational image signal, wherein the second detecting step further comprises:

generating, as a comparing step, a waveform based on the data detected in the change detecting step and calculating a degree of matching between the waveform and a predetermined waveform; and determining whether or not the operator has carried out an operation with respect to the operational image.

8. The method of claim 7, wherein the change detecting step further comprises:

detecting, as a histogram detecting step, a histogram showing frequencies of occurrence of gradation levels in the image signal of the hand corresponding area, wherein the comparing step comprises:

generating the waveform based on temporal changes of the detected histogram in the histogram detecting step to determine whether or not the operator has carried out an operation with respect to the operational image.

9. The method of claim 7, wherein the extracting step further comprises:

extracting, as a specific-color area extracting step, a specific-color area from the mirror image, the specific-color area corresponding to the hand of the operator pointing to the displayed operational image.

10. The method of claim 9, wherein the extracting step further comprises:

extracting, as a gradation range extracting step, a range of predetermined gradation levels from the mirror image signal; and outputting, as a synthesizing step, a synthesized signal of a signal indicating that an image signal of the specific-color area has been extracted in the extracting step and a signal indicating that an image signal of the range of the predetermined gradation levels has been extracted in the gradation range extracting step.

11. The method of claim 10, wherein the extracting step further comprises:

replacing an area excluding the hand corresponding area from the mirror image with a given brightness or color if the synthesized signal is not output in the synthesizing step.

12. The method of claim 7, wherein the second extracting step further comprises:

calculating, as a calculating step, a time when an integral value of the waveform with respect to time takes to reach a first threshold; and scaling the mirror image signal output based on the calculated time in the calculating step.

* * * * *